US011097805B2

(12) United States Patent
Hattori et al.

(10) Patent No.: US 11,097,805 B2
(45) Date of Patent: Aug. 24, 2021

(54) ELECTRIC ASSIST BICYCLE AND DRIVE SYSTEM OF THE SAME

(71) Applicant: YAMAHA HATSUDOKI KABUSHIKI KAISHA, Iwata (JP)

(72) Inventors: Yoichiro Hattori, Shizuoka (JP); Yuki Kimpara, Shizuoka (JP); Rempei Nakayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 281 days.

(21) Appl. No.: 16/268,520

(22) Filed: Feb. 6, 2019

(65) Prior Publication Data

US 2019/0241234 A1    Aug. 8, 2019

(30) Foreign Application Priority Data

Feb. 7, 2018 (JP) .............................. JP2018-019913

(51) Int. Cl.
*B62M 6/00* (2010.01)
*B62M 6/45* (2010.01)
*B62M 9/00* (2006.01)
*B62J 45/00* (2020.01)
*B62J 50/10* (2020.01)
(Continued)

(52) U.S. Cl.
CPC ................ *B62M 6/45* (2013.01); *B62J 99/00* (2013.01); *B62J 50/20* (2020.02)

(58) Field of Classification Search
CPC . B62M 6/00; B62M 6/40; B62M 6/45; B62M 6/50; B62M 6/55; B62M 6/70; B62M 25/00; B62M 25/06; B62M 3/08; B62J 99/00; B62J 50/00; B62J 50/20–22; B62J 45/20; B62J 45/40; B60L 50/00; B60L 50/16; B60L 50/20; B60L 3/00; B60L 1/00

See application file for complete search history.

(56) References Cited

U.S. PATENT DOCUMENTS 6,168,552 B1 * 1/2001 Eschenbach ......... A63B 22/001
                                                      482/51
6,361,476 B1 * 3/2002 Eschenbach ......... A63B 22/001
                                                      482/51

(Continued)

FOREIGN PATENT DOCUMENTS

DE    10 2016 210 335 A1    1/2017
EP         2 218 635 A1    8/2010

(Continued)

*Primary Examiner* — Yonel Beaulieu
(74) *Attorney, Agent, or Firm* — Keating and Bennett, LLP

(57) ABSTRACT

An electric assist bicycle and a drive system therefor includes a controller that includes control modes in which different assist ratios are calculated as control modes of the electric motor, and that stores a mode change condition that determines a change of the control mode. The controller performs the mode change when a pedal is located between an angular position that follows by 45 degrees a lowermost position of a locus of the pedal and an angular position that precedes by 45 degrees the lowermost position. Accordingly, the mode change is performed when the pedaling force exerted by a rider is relatively low such that the rider does not feel uncomfortable due to a rapid change of the load applied to the rider.

18 Claims, 14 Drawing Sheets

(51) Int. Cl.
  *B60L 50/00*   (2019.01)
  *B62J 99/00*   (2020.01)
  *B62J 50/20*   (2020.01)

(56) References Cited

U.S. PATENT DOCUMENTS

| | | | | |
|---|---|---|---|---|
| 7,814,800 | B2* | 10/2010 | Roovers | G01L 5/13 |
| | | | | 73/828 |
| 9,126,654 | B1 | 9/2015 | Cheng | |
| 10,106,223 | B2* | 10/2018 | Usui | B62M 6/45 |
| 10,232,736 | B2* | 3/2019 | Hamann | B60L 50/20 |
| 2010/0248905 | A1* | 9/2010 | Lu | A63B 22/0605 |
| | | | | 482/57 |
| 2012/0109436 | A1* | 5/2012 | Saida | B60L 50/66 |
| | | | | 701/22 |
| 2013/0054068 | A1* | 2/2013 | Shoge | B62M 6/45 |
| | | | | 701/22 |
| 2016/0121730 | A1 | 5/2016 | Fujita et al. | |
| 2018/0257741 | A1* | 9/2018 | Saruwatari | B62M 3/08 |
| 2019/0299797 | A1* | 10/2019 | Hasumi | B62M 6/45 |
| 2019/0315433 | A1* | 10/2019 | Hasumi | B60L 15/10 |
| 2020/0207216 | A1* | 7/2020 | Hasumi | B62J 45/413 |

FOREIGN PATENT DOCUMENTS

| | | | |
|---|---|---|---|
| JP | 11-034966 | A | 2/1999 |
| JP | 2010-264977 | A | 11/2010 |
| JP | 2016-101761 | A | 6/2016 |
| WO | 2017/135716 | A1 | 8/2017 |

\* cited by examiner

FIG.8

| | HARD PEDALING DETERMINATION | STEADY HIGH LOAD DETERMINATION | | STEADY LOW LOAD DETERMINATION | | |
|---|---|---|---|---|---|---|
| | THRESHOLD VALUE ON PEAK PEDALING FORCE | THRESHOLD VALUE ON PEAK PEDALING FORCE | THRESHOLD VALUE ON AVERAGE OF PEAK PEDALING FORCES | THRESHOLD VALUE ON PEAK PEDALING FORCE | THRESHOLD VALUE ON AVERAGE OF PEAK PEDALING FORCES | THRESHOLD VALUE OF MIDDLE PEDALING FORCE |
| LEVEL 1 | 100 | 80 | 85 | 55 | 50 | 30 |
| LEVEL 2 | 90 | 60 | 65 | 45 | 40 | 20 |
| LEVEL 3 | ... | ... | ... | ... | ... | ... |
| EASINESS IN OCCURRENCE OF MODE CHANGE | | | | | | |

ELECTRIC ASSIST BICYCLE AND DRIVE SYSTEM OF THE SAME

CROSS REFERENCE TO RELATED APPLICATIONS

This application claims the benefit of priority to Japanese Patent Application No. 2018-19913 filed on Feb. 7, 2018. The entire contents of this application are hereby incorporated herein by reference.

BACKGROUND OF THE INVENTION

1. Field of the Invention

The present invention relates to an electric assist bicycle and a drive system therefor.

2. Description of the Related Art

Electric assist bicycles have been used which assist a pedaling motion of a rider with an electric motor. JP 2010-264977 A, JP 2016-101761 A, and JP 11-034966 A each disclose a bicycle which has a plurality of modes having different assist ratios as control modes of the electric motor, and automatically changes the mode without depending on a manual operation by the rider. For these bicycles, a mode change condition is predefined, and when the change condition is fulfilled, a controller changes the mode. For example, in JP 2010-264977 A, when the pedaling force of the rider exceeds a threshold value, the control mode is changed from an energy-saving drive mode to a fast drive mode.

However, if the assist ratio increases due to a mode change at the same time point at which the mode change condition is fulfilled, the rider may feel uncomfortable depending on the time point at which the mode change condition is fulfilled because the load applied from the pedal to the rider significantly decreases, in other words, the pedaling force applied from the rider to the pedal significantly decreases.

SUMMARY OF THE INVENTION

Preferred embodiments of the present invention provide drive systems for electric assist bicycles and electric assist bicycles that are able to achieve a comfortable mode change.

According to a preferred embodiment of the present invention, a drive system of an electric assist bicycle includes a sensor that detects a pedaling force applied to a pedal from a rider; an electric motor that outputs a drive power to assist a pedaling motion of the rider; and a controller configured or programmed to calculate an assist ratio provided by the electric motor. The controller includes, as control modes of the electric motor, a first mode and a second mode having different assist ratios, and determines whether or not a mode change condition is fulfilled, in which the mode change condition is defined as a mode change from the first mode to the second mode. The controller performs the mode change from the first mode to the second mode when the pedal is located between a first angular position that follows by 45 degrees a lowermost position of a locus of the pedal and a second angular position that precedes by 45 degrees the lowermost position. The drive system is able to provide a comfortable mode change to the rider. It should be noted that the pedals are not elements of the drive system. Further, when performing the mode change, the controller may not detect the position of the pedal to determine whether or not the pedal is located between the first angular position and the second angular position. In other words, the scope of the present invention covers a preferred embodiment in which the mode change made at a time point based on an output of the sensor (e.g., the sensor that detects the pedaling force) falls within a period corresponding to the angular range between the first and second angular positions.

According to a preferred embodiment of the present invention, the mode change from the first mode to the second mode may be performed after a delay from a time point when a pedaling force that fulfills the mode change condition is detected. According to this configuration, since the time point at which the mode change condition is fulfilled and the time point at which the mode change is performed are shifted from each other, it is possible to appropriately set both time points.

According to a preferred embodiment of the present invention, the controller may be configured or programmed to perform the mode change from the first mode to the second mode at an angular position based on a pedaling force detected by the sensor. According to this configuration, a dedicated sensor to detecting the angular position (an absolute value) of the crank shaft becomes unnecessary, and it is possible to achieve a reduction of the cost or a reduction of the number of components.

According to a preferred embodiment of the present invention, the controller may be configured or programmed to perform the mode change from the first mode to the second mode at an angular position at which a crank shaft rotates by a predetermined angle from a position at which the pedaling force is a local maximum value. According to this configuration, a dedicated sensor that detects the angular position (an absolute value) of the crank shaft becomes unnecessary, and it is possible to achieve a reduction of the cost or a reduction of the number of components.

According to a preferred embodiment of the present invention, the drive system may further include a display that shows a current control mode. This configuration enables the rider to correctly determine or identify the current control mode, thus improving the convenience of the rider.

According to a preferred embodiment of the present invention, the controller may be configured or programmed to use a first map in the first mode that defines a relationship between an assist ratio and a pedaling force applied to the pedal, and the controller may be configured or programmed to use a second map in the second mode that defines a relationship between an assist ratio and a pedaling force applied to the pedal.

According to a preferred embodiment of the present invention, the controller may further include a third mode having a different assist ratio from the first mode and the second mode, and the controller may include a predetermined mode change disapproval period that prevents two consecutive mode changes. In other words, the controller may include the mode change disapproval period between a mode change from one of the first mode, the second mode, and the third mode to another one of the modes. According to this configuration, the mode changes occur at an appropriate frequency.

According to a preferred embodiment of the present invention, when one pedaling motion is defined as a rotation from an uppermost position to the lowermost position of the locus of the pedal, the predetermined mode change disapproval period may be shorter than a time necessary to perform the one pedaling motion. According to this configuration, the mode changes are performed at short time intervals during which, for example, a high load is applied and the rotational speed of the crank shaft is low (e.g., when starting to climb a slope).

According to a preferred embodiment of the present invention, when one pedaling motion is defined as a rotation from an uppermost position to the lowermost position of the locus of the pedal, the predetermined mode change disapproval period may be equal to, or longer than, a time necessary to perform the one pedaling motion. According to this configuration, it is possible to prevent the frequency of mode changes from becoming higher than necessary.

According to a preferred embodiment of the present invention, when one pedaling motion is defined as a rotation from an uppermost position to the lowermost position of the locus of the pedal, a first disapproval period and a second disapproval period longer than the first disapproval period are included in the predetermined mode change disapproval period. One of the first disapproval period and the second disapproval period determined based on a riding situation of the bicycle is performed between the consecutive mode changes. Thus, the mode change is made at an appropriate frequency based on the riding situation. For example, when the bicycle is rapidly accelerated, the control modes may be changed in a stepwise manner at relatively short time intervals. On the other hand, when the bicycle accelerates steadily, for example, the time intervals between changes of the control modes may be longer.

According to a preferred embodiment of the present invention, when one pedaling motion is defined as a rotation from an uppermost position to the lowermost position of the locus of the pedal, the predetermined mode change disapproval period may be defined as a number of the pedaling motions or a rotation amount of the crank shaft, and the controller may be configured or programmed to count the number of the pedaling motions and the rotation amount of the crank shaft, and may determine whether or not the predetermined mode change disapproval period has elapsed based on the counted number of pedaling motions and the rotation amount of the crank shaft. According to this configuration, the mode change is performed at relatively short time intervals when moving as a result of a high pedaling rate, for example. As a result, the mode change is made at an appropriate frequency based on the manner of pedaling.

According to a preferred embodiment of the present invention, the controller may be configured or programmed to determine whether or not the mode change condition is fulfilled based on the pedaling force detected by the sensor. Thus, it is possible to change the control mode when a high load is applied to the rider, or when the load to be applied to the rider decreases.

According to a preferred embodiment of the present invention, the controller may include at least three modes including the first mode, the second mode, and a third mode, the second mode having a higher assist ratio than the first mode, the third mode having a higher assist ratio than the second mode, the mode change condition from the first mode to the second mode may include a condition that the pedaling force detected by the sensor is higher than a first threshold value, a mode change condition from the second mode to the third mode may include a condition that the pedaling force detected by the sensor is higher than a second threshold value, and the second threshold value is higher than the first threshold value. This configuration prevents the change from the second mode to the third mode from being performed immediately after performing the change from the first mode to the second mode. It should be noted that the "pedaling force detected by the sensor" includes the pedaling force itself, a local maximum of the pedaling force, a local minimum of the pedaling force, an average of the pedaling force and so on.

According to a preferred embodiment of the present invention, the controller may include at least three modes including the first mode, the second mode, and a third mode. At least one of a mode change condition from the first mode to the second mode and a mode change condition from the second mode to the third mode may be adjusted through an input operable by an operator. The operator is a rider of the bicycle or a maintenance staff for the bicycle, for example. According to this configuration, it is possible to change the control mode at a time point suitable for an individual rider.

According to a preferred embodiment of the present invention, the controller may include at least three control modes including the first mode, the second mode, and a third mode. The controller may be configured or programmed to receive an instruction from an input operable by an operator, wherein the instruction limits the control mode to one or more of the at least three control modes. The operator is, for example, a rider of the bicycle or a maintenance staff for the bicycle. According to this configuration, it becomes possible to drive the electric motor only with the control modes that suit the preference of the rider.

According to a preferred embodiment of the present invention, a first mode change condition and a second mode change condition may be included in the mode change condition from the first mode to the second mode. The controller may be configured or programmed to calculate a first value and a second value different from the first value based on an output of the sensor. The first mode change condition may be based on the first value, and the second mode change condition may be based on the second value. According to this configuration, since a plurality of values is used, the mode changes are made at more appropriate time points than in the case in which just one value is used alone, for example. Here, the expression that "values different in type" means that the arithmetic expressions used for the calculation of the values are different from each other. For example, when the first value is the local maximum, the local minimum of the pedaling force or the like, the second value is, for example, an average of the pedaling force.

According to a preferred embodiment of the present invention, a first mode change condition and a second mode change condition may be included in the mode change condition from the first mode to the second mode. When the one pedaling motion is defined as a rotation from an uppermost position to the lowermost position of the locus of the pedal, the first mode change condition may be based on the pedaling force during the one pedaling motion, and the second mode change condition may be based on the pedaling forces during a plurality of pedaling motions. According to this configuration, the control mode is selected not only in the case (the case in which the first mode change condition is fulfilled) in which a high load is instantaneously applied to the rider, but also in the case (the case in which the second mode change condition is fulfilled) in which a high load is steadily applied to the rider.

According to a preferred embodiment of the present invention, an electric assist bicycle includes the drive system described above, and the pedal. According to the electric assist bicycle, it is possible to provide a comfortable mode change to the rider.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a table for explaining an example of a process performed by a mode change condition adjuster provided to the controller.

DETAILED DESCRIPTION OF THE PREFERRED EMBODIMENTS

The terminology used herein is for the purpose of describing particular preferred embodiments only and is not intended to be limiting of the present invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which preferred embodiments of the present invention pertain. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the preferred embodiments of the present invention, it will be understood that a number of technologies are disclosed. Each of these technologies has individual benefits and each can also be used in conjunction with one or more, or in some cases all, of the other disclosed technologies. Accordingly, for the sake of clarity, this description will refrain from repeating every possible combination of the individual technologies in an unnecessary manner. Nevertheless, the specification and claims should be read with the understanding that such combinations are entirely within the scope of the present invention and the claims.

In the following description, for purposes of explanation, numerous specific details are set forth in order to provide a thorough understanding of the preferred embodiments of the present invention. It will be evident, however, to one skilled in the art that preferred embodiments of the present invention may be practiced without these specific details.

The present disclosure is to be considered as exemplifications of preferred embodiments of the present invention, and is not intended to limit the present invention to the specific preferred embodiments illustrated by the figures or description below.

Figure 1:
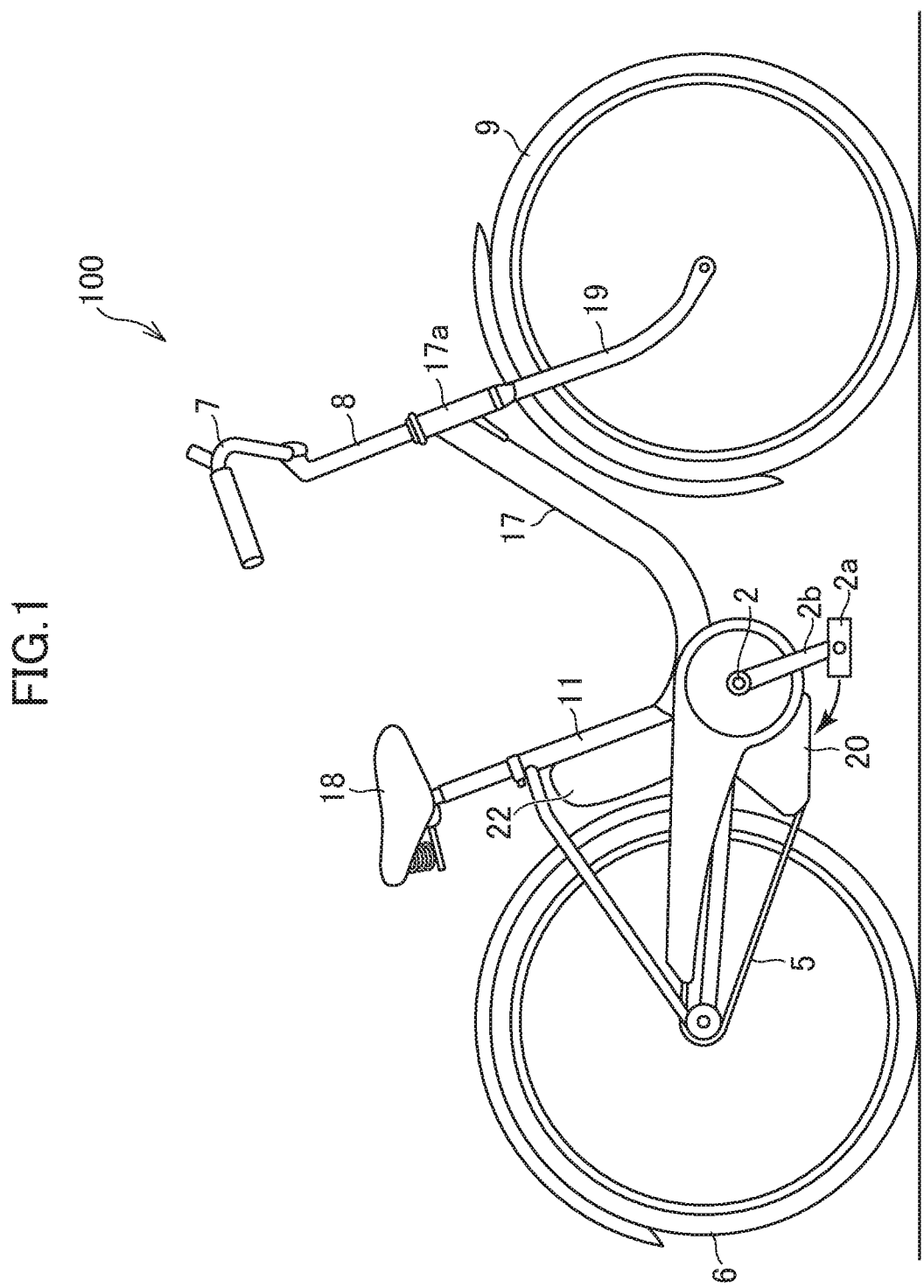
FIG. 1 is a side view showing an example of an electric assist bicycle according to a preferred embodiment of the present disclosure.
Figure 2:
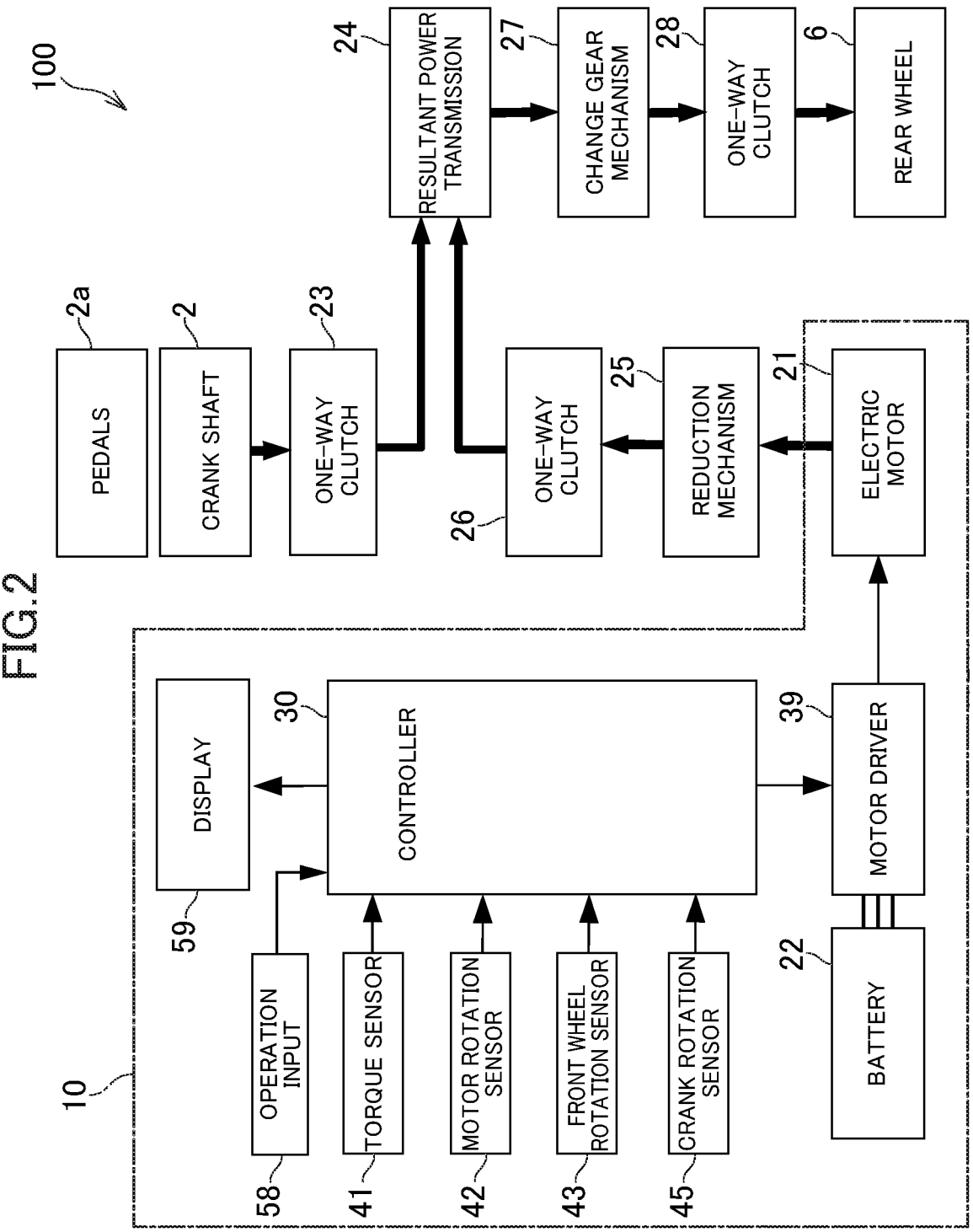
FIG. 2 is a block diagram showing a configuration of the electric assist bicycle.

The present invention will now be described by referencing the appended figures representing preferred embodiments of the present invention. FIG. 1 is a side view of an electric assist bicycle 100 according to a preferred embodiment of the invention. FIG. 2 is a block diagram showing a configuration of the electric assist bicycle 100. In FIG. 2, the thick solid lines represent transmission of the power, and thin solid lines represent a signal or an electrical current. The electric assist bicycle 100 includes a drive system 10 that assists the pedaling motion of the rider. The drive system 10 includes electrical components described below such as an electric motor 21, a controller 30, a motor drive 39 and an operation input 58. Hereinafter, the electric assist bicycle 100 is simply described as a bicycle.

As shown in FIG. 1, the bicycle 100 includes a crank shaft 2. A right pedal 2a and a left pedal 2a are respectively attached to the right end and the left end of the crank shaft 2 via cranks 2b. The left and right pedals 2a rotate around the crank shaft 2. The crank shaft 2 is supported at the lower end of a seat tube 11. A saddle 18 is fixed at the upper end of the seat tube 11. The front portion of the bicycle 100 includes a handle stem 8, a handle 7 fixed to the upper portion of the handle stem 8, a front fork 19 fixed to the lower portion of the handle stem 8, and a front wheel 9 supported at the lower end of the front fork 19. The handle stem 8 is supported by a head pipe 17a disposed at the front end of a frame 17. The shape of the frame 17 is not limited to the example shown in FIG. 1, and can arbitrarily be changed.

As shown in FIG. 1, the bicycle 100 includes a drive unit 20. The drive unit 20 includes the electric motor 21 (see FIG. 2) that outputs and assist power (assist torque) to assist the rider pedaling the rear wheel 6, and a reduction mechanism (see FIG. 2). The electric motor 21 is driven by electricity supplied from a battery 22. In the bicycle 100, the battery 22 is installed on the rear side of the seat tube 11, and the drive unit 20 is disposed on the rear side of the crank shaft 2. The positions of the electric motor 21 and the battery 22 are not limited to the example in the bicycle 100, and can arbitrarily be changed.

The drive power applied to the crank shaft 2 through the pedals 2a is transmitted to a resultant power transmission 24 through a one-way clutch 23 as shown in FIG. 2. Further, in the bicycle 100, the drive power (the assist power) output from the electric motor 21 is transmitted to the resultant power transmission 24 through the reduction mechanism 25 and a one-way clutch 26. The resultant power transmission 24 includes a shaft, a rotary member provided for the shaft, a chain 5 (FIG. 1) and so on, and combines the drive power applied to the crank shaft 2 and the drive power output from the electric motor 21. In an example of the resultant power transmission 24, the two types of drive power are input to a common shaft and a common rotary member to be combined with each other. In another example, both of the drive power applied to the crank shaft 2 and the drive power output from the electric motor 21 may be input to the chain 5 to be combined with each other. The drive power combined by the resultant power transmission 24 is transmitted to the rear wheel 6 through, for example, a change gear mechanism 27 and a one-way clutch 28 as shown in FIG. 2. The change gear mechanism 27 is a mechanism in which the gear is able to be changed by an operation member (e.g., a lever) disposed in, for example, the handle 7.

The bicycle 100 includes a sensor that detects the pedaling force applied by the rider to the pedals 2a. The sensor is, for example, a torque sensor 41 (see FIG. 2) that outputs a signal corresponding to the torque in the crank shaft 2. The torque sensor 41 is, for example, a magnetostrictive sensor installed in the crank shaft 2, but may be a sensor of a different type. Hereinafter, the torque detected by the torque sensor 41, namely the torque of the crank shaft 2, is referred to as a "pedaling force."

The bicycle 100 includes a crank rotation sensor 45 that outputs a signal corresponding to rotation of the crank shaft 2. The crank rotation sensor 45 is, for example, a sensor that generates a pulse signal in accordance with the rotation of the crank shaft 2. The controller 30 is configured or programmed to calculate a rotation amount (an angular change) of the crank shaft 2, a rotational speed of the crank shaft 2 or the like based on the output of the crank rotation sensor 45. Hereinafter, the rotation amount of the crank shaft 2 is referred to as a "crank angular change." It should be noted that a sensor that is able to detect an angular position (an angular position) of the crank shaft 2 may be used as the crank rotation sensor 45.

Further, the bicycle 100 includes a motor rotation sensor (an encoder) 42 that outputs a signal corresponding to rotation of the electric motor 21, and a front wheel rotation sensor 43 that outputs a signal corresponding to rotation of the front wheel 9. The controller 30 calculates the rotational speed of the electric motor 21 based on the output of the motor rotation sensor 42, and calculates the vehicle speed based on the output of the front wheel rotation sensor 43.

Further, the bicycle 100 includes the operation input 58 and a display 59. The display 59 includes, for example, a display panel and a light emitting diode (LED), and displays information related to the control performed by the controller 30, the remaining power of a battery 22, information (e.g., a distance) related to travel of the bicycle 100, and so on. In the bicycle 100, the display 59 displays the control modes (e.g., a high mode and a standard mode) of the electric motor 21. The control modes will be described below in detail. The operation input 58 includes operation members (e.g., a button and a lever) which are able to be operated by the rider, and inputs a signal corresponding to the operation of the members to the controller 30. In the bicycle 100, the rider is able to select the control mode of the electric motor 21 through the operation input 58. A touch sensor as the operation input 58 may be attached to the display 59 to detect the position of a finger of the rider touching the display 59.

The bicycle 100 includes the controller 30 configured or programmed to control the electric motor 21 based on the output of the torque sensor 41. The controller 30 includes at least one memory that stores programs related to the control of the electric motor 21 and a map, and at least one microprocessor that executes the programs. The memory of the controller 30 includes a map previously stored therein which defines a relationship between the assist ratio and the vehicle speed, change conditions of the control modes described below, and so on. When the bicycle 100 is traveling, the controller 30 calculates the assist ratio corresponding to the vehicle speed, calculates the assist power corresponding to the assist ratio and the pedaling force detected from the output of the torque sensor 41, and then outputs a command value corresponding to the assist power to the motor driver 39, for example. The motor driver 39 is supplied with electricity from the battery 22, and supplies the electric motor 21 with the electricity corresponding to the command value.

Figure 3:
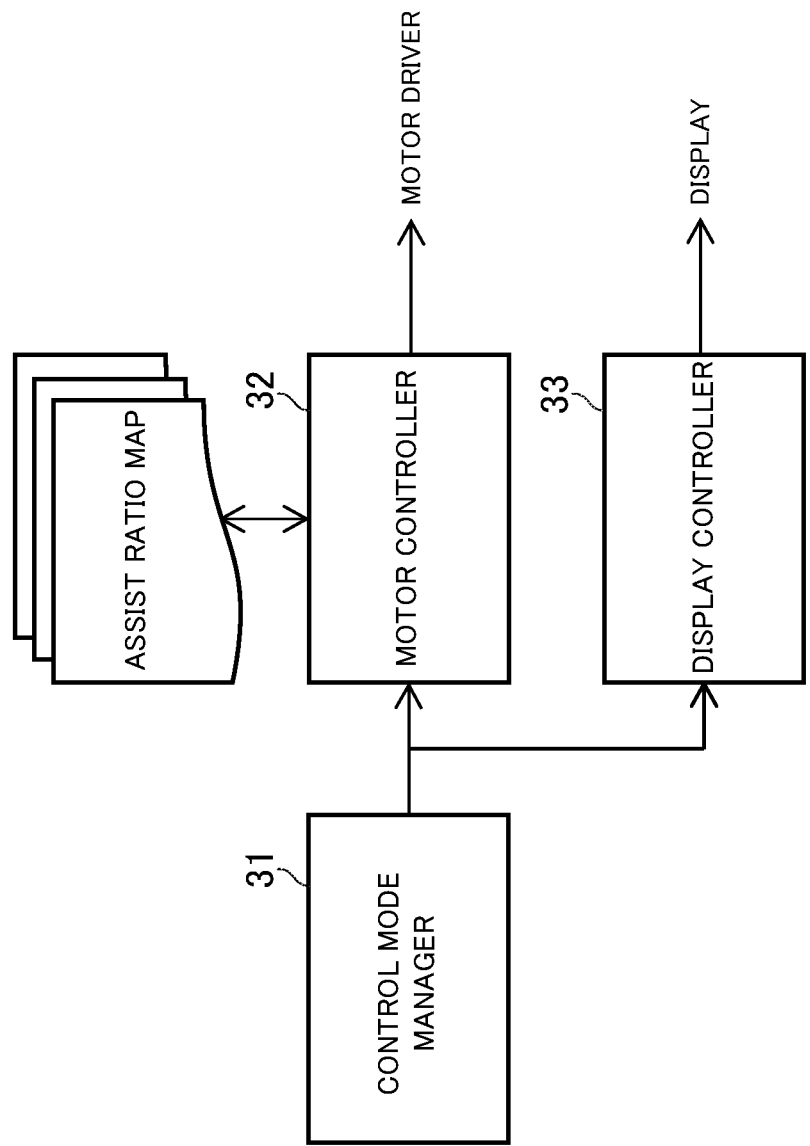
FIG. 3 is a block diagram showing functions performed by a controller.

FIG. 3 is a block diagram showing functions performed by the controller 30. The controller 30 includes a control mode manager 31, a motor controller 32, and a display controller 33. These functions are performed by the microprocessor of the controller 30 executing the programs stored in the memory.

The controller 30 includes a plurality of control modes having different assist ratios from each other as the control modes of the electric motor 21. The controller 30 includes, for example, four control modes, hereinafter, these modes are referred to as a "high mode," a "standard mode," an "ECO mode," and a "super ECO mode," respectively. The number of the control modes can be smaller than 4, or can be larger than 4. The assist ratio is defined in advance based on, for example, the vehicle speed, and the four control modes have different assist ratios from each other when compared at the same vehicle speed. The control modes have the following relationship of the assist ratio, for example: (high mode)>(standard mode)>(ECO mode)>(super ECO mode).

It should be noted that, the four control modes may have a vehicle speed range (e.g., a high vehicle speed range) in which the assist ratio is the same. Specifically, there may be a vehicle speed range in which the assist ratio of the high mode is equal to the assist ratio of the standard mode, a vehicle speed range in which the assist ratio of the standard mode is equal to the assist ratio of the ECO mode, and a vehicle speed range in which the assist ratio of the ECO mode is equal to the assist ratio of the super ECO mode.

The motor controller 32 calculates the vehicle speed based on the output of the rotation sensor (e.g., the front wheel rotation sensor 43), and then calculates the assist ratio corresponding to the vehicle rate. The memory of the controller 30 includes a plurality of maps (hereinafter referred to as "assist ratio maps" stored therein that define the assist ratio corresponding to the vehicle speed. The plurality of assist ratio maps respectively correspond to the plurality of control modes. When the bicycle 100 is traveling, the motor control 32 calculates the assist ratio with reference to the assist ratio map corresponding to the control mode currently selected. Then, the motor controller 32 calculates the assist power corresponding to the assist ratio and the pedaling force detected from the output of the torque sensor 41, and then outputs the command value corresponding to the assist power to the motor driver 39.

Figure 4:
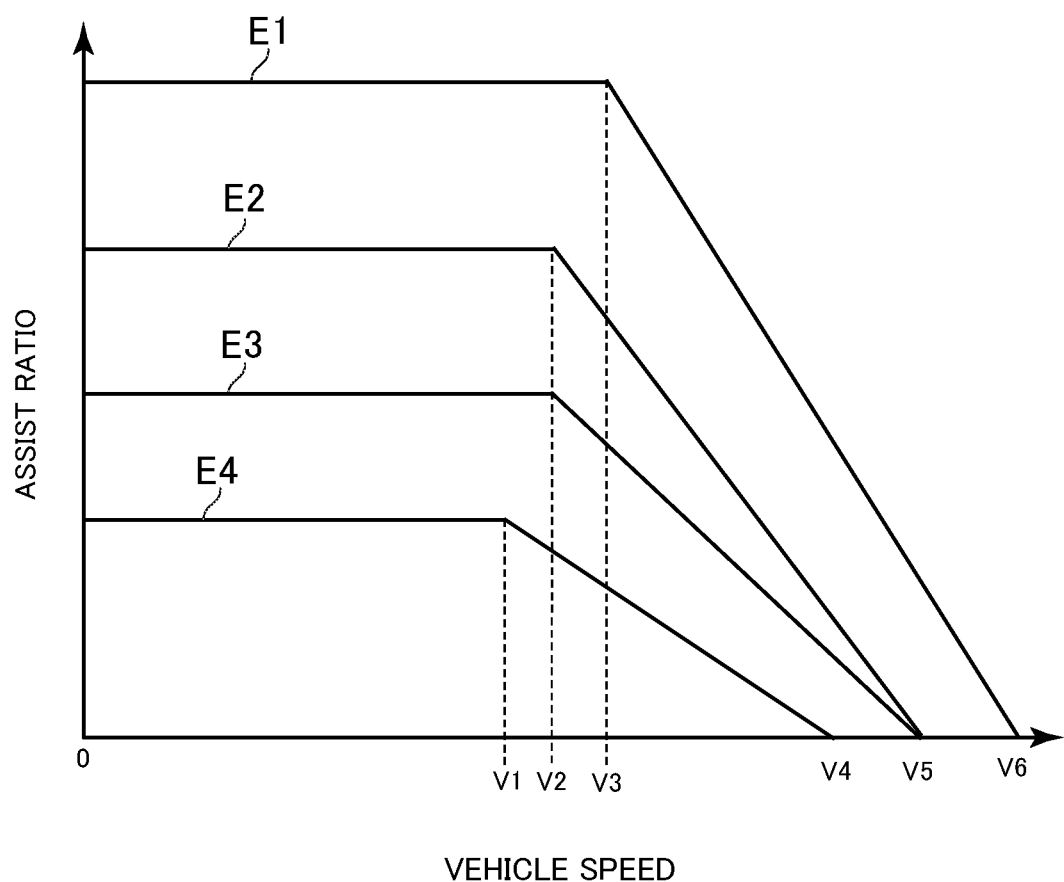
FIG. 4 is a diagram showing an example of an assist ratio map provided to the controller.

FIG. 4 is a diagram for explaining an example of the plurality of assist ratio maps. In FIG. 4, the horizontal axis represents the vehicle speed and the vertical axis represents the assist ratio. In FIG. 4, the lines E1, E2, E3, and E4 respectively represent examples of the relationships between the vehicle speed and the assist ratio in the four control modes (the high mode, the standard mode, the ECO mode, and the super ECO mode). In the high mode (the line E1) shown in the drawing, the assist ratio is constant in the vehicle speed range from 0 to V3, and gradually decreases in the vehicle speed range higher than V3. Regarding other modes, the assist ratio is constant in the vehicle speed range from 0 to a vehicle speed (V1, V2 in FIG. 4), and gradually decreases in the vehicle speed range exceeding the vehicle speed (V1, V2 in FIG. 4). As shown in FIG. 4, comparing the assist ratios of the respective control modes with each other at the same vehicle speed, the four assist ratios satisfy the following conditions:

(high mode)>(standard mode)>(ECO mode)>(super ECO mode).

It should be noted that, the assist ratio maps shown in FIG. 4 are illustrative only, and can arbitrarily be changed. For example, as described above, there may be a vehicle speed range in which the assist ratio of the high mode is equal to the assist ratio of the standard mode, a vehicle speed range in which the assist ratio of the standard mode is equal to the assist ratio of the ECO mode, and a vehicle speed range in which the assist ratio of the ECO mode is equal to the assist ratio of the super ECO mode.

It should be noted that a plurality of assist ratio maps may be provided for one control mode. In this case, the motor control 32 selects one map corresponding to the control mode currently selected based on the riding situation from the plurality of assist ratio maps (referred to as a "map group" here), and then calculates the assist ratio with reference to the assist ratio map thus selected. For example, the map group may include a plurality of assist ratio maps for the standard mode. Further, in the case in which the standard mode is selected, the motor controller 32 may select any one of the assist ratio maps in the map group based on the riding situation, and then calculate the assist ratio with reference to the selected assist ratio map. For a preferred embodiment of the present invention in which the map group including a plurality of assist ratio maps is provided for each control mode as described above, the "change of the control mode" includes a change of the assist ratio map group.

In the bicycle 100, the assist ratio maps are provided for the respective control modes, and the assist ratio map of each control mode is different from the assist ratio maps of the other control modes. However, a common assist ratio map may be used in some of the control modes (e.g., two or three of the control modes). For example, a common assist ratio map may be used in both of the ECO mode and the super ECO mode. Further, for example, while the ECO mode uses a value obtained from the common assist ratio map as the assist ratio, the super ECO mode may use, as the assist ratio, a value obtained by correcting the value obtained from the common assist ratio map. In the correction, for example, the value obtained from the assist ratio map is multiplied by a correction coefficient K (K<1). In other words, the plurality of control modes may use a common assist ratio map and may be different from each other in the computing equation used to calculate the assist ratio, that is, having a different coefficient and constant included in the computing equation. According to such a method, the assist ratios calculated in the respective control modes are different from each other.

The control mode manager 31 selects/changes the control mode based on the riding situation of the bicycle 100 or an instruction of the rider. In other words, the control mode manager 31 selects/changes the assist ratio map to be used in the control of the motor controller 32, for example. The control mode manager 31 may automatically change the control mode without the operation of the rider when the mode change condition defined in advance is fulfilled. The mode change condition is a condition based on the pedaling force, and the control mode manager 31 determines whether or not the pedaling force (e.g., the local maximum and an average) calculated based on the output of the torque sensor 41 fulfills the mode change condition. For example, the control mode manager 31 determines whether or not the pedaling force calculated based on the output of the torque sensor 41 exceeds a threshold value, and whether or not the calculated pedaling force falls below the threshold value. In the case in which the calculated pedaling force exceeds the threshold value, the control mode manager 31 changes the control mode toward the upside. The "change toward the upside" means that the control mode is changed to a mode that has a higher assist ratio. In the bicycle 100, the "change toward the upside" means that the control mode is changed closer to the "high mode." Further, in the case in which the calculated pedaling force falls below the threshold value, the control mode manager 31 changes the control mode to the downside. The "change to the downside" means that the control mode is changed to the mode that has a lower assist ratio. In the bicycle 100, "change to the downside" means that the control mode is changed closer to the "super ECO mode."

In the bicycle 100, the mode change instruction by the rider is able to be input to the controller 30 through the operation input 58. One of the mode change conditions may also be that such a mode change instruction is input from the operation input 58 to the controller 30. In this case, the control mode manager 31 performs the mode change when the mode change instruction is input from the operation input 58 to the controller 30.

Figure 5:
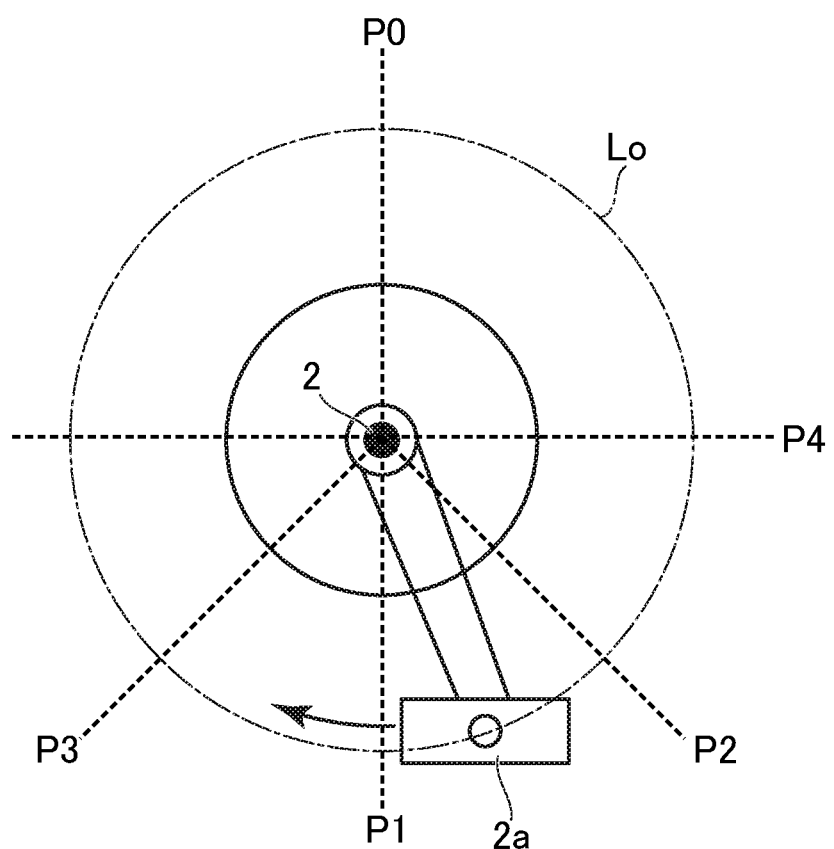
FIG. 5 is a diagram for explaining the time point at which a mode change is performed, that is, an angular position of a crank shaft at which the mode change is performed.

FIG. 5 is a diagram for explaining the time point at which the mode change is performed. The time point corresponds to an angular position of the crank shaft 2 at which the mode change is performed. Hereinafter, the "angular position of the crank shaft 2" is referred to as a "crank position". The pedals 2a each have a circular locus Lo about the crank shaft 2. When the mode change condition is fulfilled, the control mode manager 31 performs the mode change at the time point at which the pedal 2a is located at the lowermost position P1 (or a position close to the lowermost position P1) of the locus Lo.

More specifically, the control mode manager 31 performs the mode change at which the pedal 2a is located between a first angular position that follows by 45 degrees a lowermost position P1 and a second angular position that precedes by 45 degrees the lowermost position P1. The first angular position is a position 45 degrees added to the lowermost position P1, and hereinafter will be referred to as a rear limit position P3. Further, the second angular position is a position 45 degrees subtracted from the lowermost position P1, and hereinafter will be referred to as a front limit position P2. In other words, when the pedal 2a is located between the front limit position P2 and the rear limit position P3, the controller 30 performs the change of the assist ratio due to the change of the control mode. The crank position at which the mode change is performed is preferably between a position that follows by 30 degrees the lowermost position P1 and a position that precedes by 30 degrees the lowermost position P1. The crank position at which the mode change is performed is more preferably between a position that follows by 20 degrees the lowermost position P1 and a position that precedes by 20 degrees the lowermost position P1. The crank position at which the mode change is performed is more preferably between an angular position that follows by 10 degrees the lowermost position P1 and an angular position that precedes by 10 degrees the lowermost position P1. The lowermost position is the most preferable.

The pedaling force varies during one cycle of the pedal 2a. In general, the pedaling force is a minimum when either one of the pedals 2a is located at the lowermost position P1. Therefore, performing the mode change at the crank position described above results in the mode change being performed at a time point where the pedaling force exerted by the rider is relatively weak. As a result, it is possible to prevent a rapid change of the load applied to the rider, and an uncomfortable feeling due to the rapid change. It should be noted that the lowermost position P1 of the pedal 2a in the present preferred embodiment refers to the lowest position of the locus of the pedal Lo, and is an intersection point between the locus of the pedal Lo and the vertical line.

In general, the pedaling force applied by the rider to the pedal 2a is a maximum when the pedal 2a is located at the position (the position P4 in FIG. 5) rotated 90 degrees from the uppermost position P0 (hereinafter, the position P4 is referred to as a "horizontal position"). When the pedaling force detected at the time when the pedal 2a is located at the horizontal position P4 fulfills the mode change condition, the control mode manager 31 performs the mode change after a delay from the time point when the pedaling force has been detected (i.e., the control mode manager 31 performs the mode change when the pedal 2a is near or in the vicinity of the lowermost position P1).

Further, the control mode manager 31 secures a predetermined period between two consecutively performed mode changes. Hereinafter, this period is referred to as a "mode change disapproval period." The two consecutively performed mode changes are referred to as a "first mode change" and a "second mode change." In other words, in the case in which the mode change condition is fulfilled immediately after performing the first mode change, the control mode manager 31 does not perform the second mode change unless the mode change disapproval period elapses after the first mode change. This enables the mode changes to occur at an appropriate frequency. In other words, it is possible to prevent the mode change from being performed at a higher than necessary frequency.

The display controller 33 outputs information (e.g., a signal) to be displayed in the display 59. In the bicycle 100, the control mode currently selected is displayed on the display 59 by the display controller 33. Further, in the case in which the control mode is changed by the control mode manager 31, the control mode to be displayed on the display 59 is changed by the display controller 33. Therefore, in the case in which the mode change condition has been fulfilled, the display content of the display 59 is automatically switched without an operation by the rider.

Figure 6:
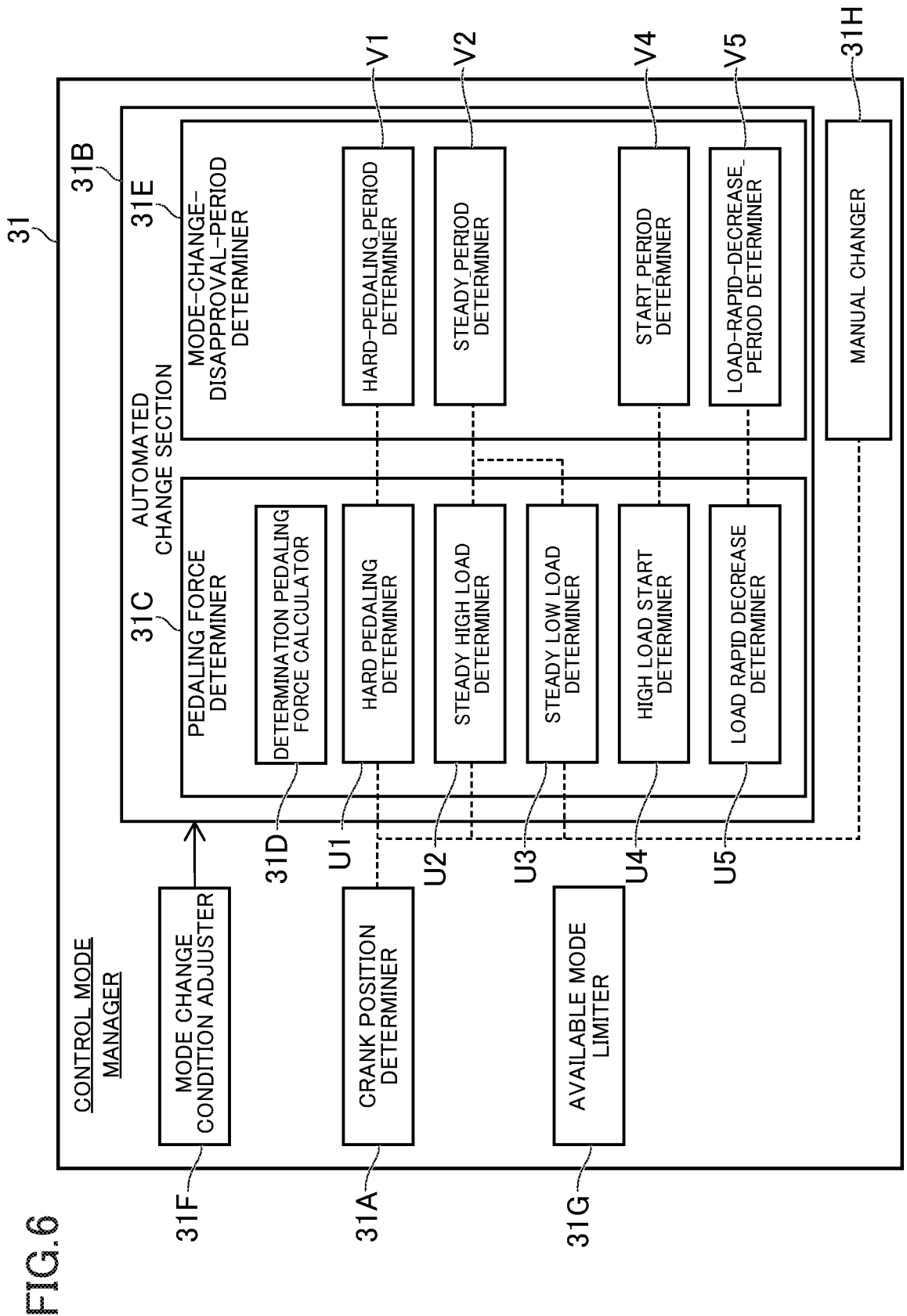
FIG. 6 is a block diagram showing functions performed by a control mode manager.

FIG. 6 is a block diagram more specifically showing functions performed by the control mode manager 31. The control mode manager 31 includes a crank position determiner 31A, an automated changer 31B, a mode change condition adjuster 31F, and an available mode limiter 31G. Further, the automated changer 31B includes a pedaling force determiner 31C and a mode change disapproval period determiner 31E. Further, the control mode manager 31 includes a manual changer 31H. These sections are also performed by the microprocessor of the controller 30 executing the programs stored in the memory.

The crank position determiner 31A determines whether or not the pedal 2a is located at the angular position where the execution of the mode change is allowed, in other words, whether or not the crank position has reached the position where the execution of the mode change is allowed. In the bicycle 100, the crank position determiner 31A determines whether or not the crank position has reached the position where the execution of the mode change is allowed based on the pedaling force detected by the torque sensor 41. The crank position determiner 31A performs, for example, the following process.

The crank position determiner 31A searches for the local maximum of the pedaling force (the "local maximum of the pedaling force" is referred to as a peak pedaling force). Then the crank position determiner 31A determines whether or not the crank angle change (a rotation amount of the crank shaft 2) has reached a predetermined angle from the crank position (the horizontal position P4 in FIG. 5) at which the peak pedaling force is determined. When the crank angle change has reached the predetermined angle, it is assumed that the pedal 2a has been located at the lowermost position P1 (or a position near or in the vicinity of the lowermost position P1), and the crank position has reached a mode change approval position (the "mode change approval position" is a crank position in which the execution of the mode change (the change in assist ratio) is allowed). The "predetermined angle" is, for example, an angle larger than 45 degrees and smaller than 135 degrees. The predetermined angle described above causes the mode change to be performed between the front limit position P2 and the rear limit position P3 shown in FIG. 5. The "predetermined angle" may be preferably an angle larger than 60 degrees and smaller than 120 degrees. More preferably, the "predetermined angle" may be an angle larger than 70 degrees and smaller than 110 degrees. More preferably, the "predetermined angle" may be an angle larger than 80 degrees and smaller than 100 degrees. In the bicycle 100, the "predetermined angle" is 90 degrees.

Figure 7:
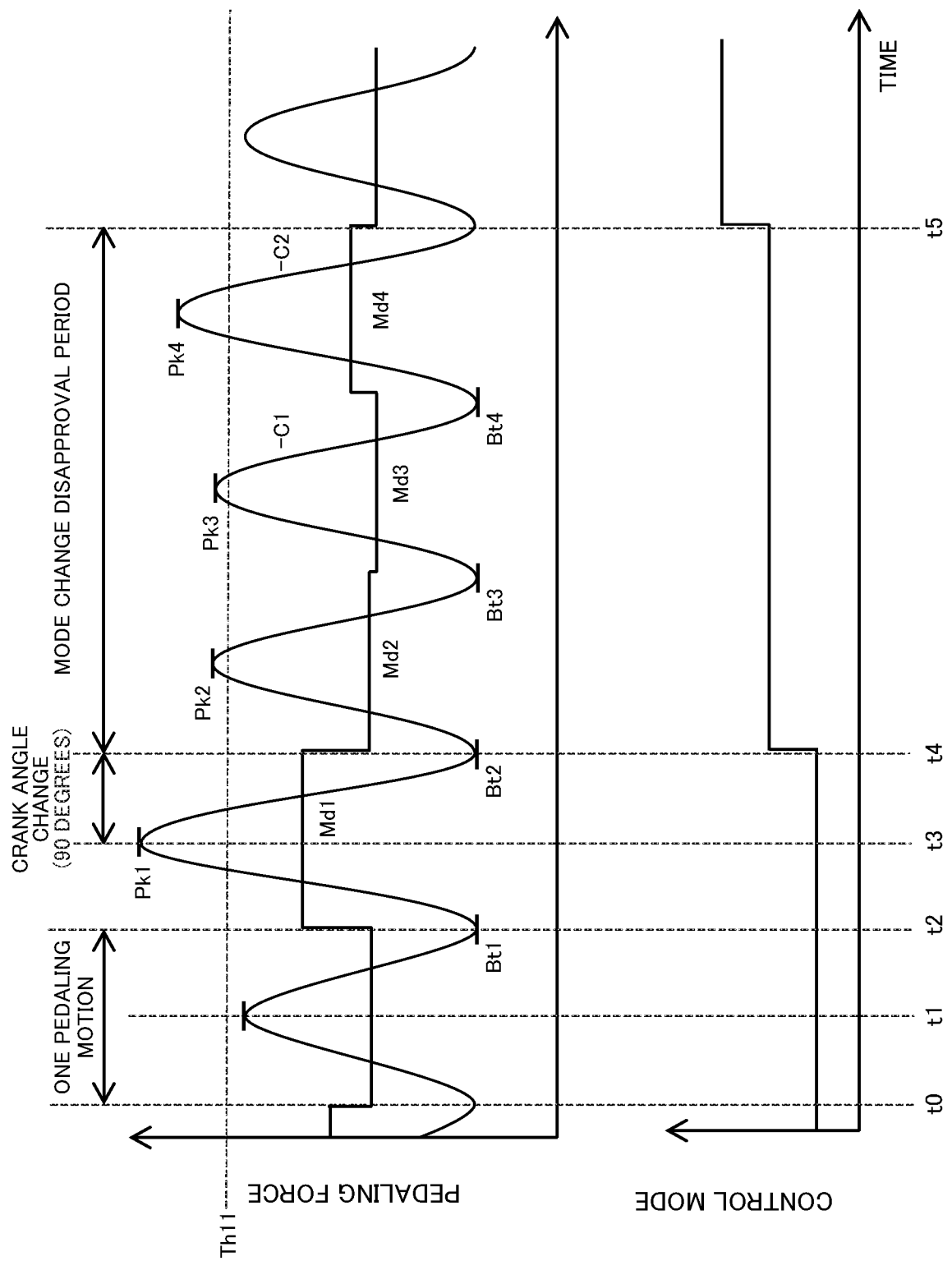
FIG. 7 is a timing chart for explaining a change of a pedaling force and the time point at which the mode change is performed.

FIG. 7 is a timing chart for explaining the change of the pedaling force and the time point (the crank position) at which the mode change is performed. As shown in the FIG. 7, the pedaling force varies periodically. For example, at t1 when the peak pedaling force is obtained, it is assumed that one of the pedals 2a (e.g., the right pedal 2a) is located at the horizontal position P4, and at t2 when the pedaling force is a local minimum value, it is assumed that the one of the pedals 2a is located at the lowermost position P1. Further, at t3 when the subsequent peak pedaling force Pk1 is obtained, it is assumed that the other of the pedals 2a (e.g., the left pedal 2a) is located at the horizontal position P4, and at t4 when the pedaling force is a local minimum value, it is assumed that the other of the pedals 2a is located at the lowermost position P1. The crank position determiner 31A searches for, for example, a local maximum (i.e., the peak pedaling force) of the pedaling force in one pedaling motion. In the present preferred embodiment, the "one pedaling motion" is defined as a motion of each pedal 2a from the uppermost position P0 to the lowermost position P1. In the above example, the one pedaling motion of the right pedal 2a corresponds to a period from t0 when the pedaling force is a local minimum value to t2 when the pedaling force is the next local minimum value, and the one pedaling motion of the left pedal 2a corresponds to a period from t2 when the pedaling force is the local minimum value to t4 when the pedaling force is the next local minimum value. When the crank position determiner 31A determines, for example, the peak pedaling force Pk1, the crank position determiner 31A starts counting the crank angle change (a rotation amount of the crank shaft 2) from the time point (t3) when the peak pedaling force Pk1 is determined. Then, when the crank angle change has reached 90 degrees (t4), the crank position determiner 31A assumes that the pedal 2a (the left pedal 2a in the above example) is located at the lowermost position P1, and determines that the crank position has reached the mode change approval position. The crank position determiner 31A performs the above process for each of the right pedal 2a and the left pedal 2a.

It should be noted that the process of the crank position determiner 31A is not limited to the example described above. For example, the following processes may be performed.

According to a preferred embodiment of the present invention, the crank position determiner 31A searches for the local maximum (the peak pedaling force) of the pedaling force in a range from the uppermost position P0 to the lowermost position P1 of the locus Lo of the pedal 2a. Then, when the pedaling force detected by the torque sensor 41 has reached a level 70% as high as the peak pedaling force, or a level 50% as high as the peak pedaling force, the crank position determiner 31A determines that the crank position has reached the mode change approval position. In other words, when the pedaling force detected by the torque sensor 41 has become "(the peak pedaling force)×k" (k is a coefficient smaller than 1), the crank position determiner 31A determines that the crank position has reached the mode change approval position.

According to a preferred embodiment of the present invention, the crank position determiner 31A may search for a local minimum of the pedaling force in one pedaling motion. Then, the crank position determiner 31A may determine that the crank position has reached the mode change approval position when the pedaling force has taken a local minimum value.

According to a preferred embodiment of the present invention, a sensor that detects not only a rotation amount (the crank angle change) of the crank shaft 2 but also the position (the angle) of the crank shaft 2 may be used as the crank rotation sensor 45. In this case, the crank position determiner 31A may determine whether or not the crank position has reached the mode change approval position based on the output of the crank rotation sensor 45 without using the pedaling force.

The control mode manager 31 performs the mode change when the crank position has reached the mode change approval position (the lowermost position P1 of the pedal 2a, for example) and the mode change condition has been fulfilled. However, in a riding situation, the control mode manager 31 may perform the mode change irrespective of whether or not the crank position has reached the mode change approval position. In other words, in a riding situation (e.g., steady movement) in which it is not suitable for the rider to notice the mode change, the control mode manager 31 performs the mode change when the crank position has reached the mode change approval position. On the other hand, in a riding situation in which the mode change has a high priority, the control mode manager 31 may perform the mode change irrespective of the crank position. In the bicycle 100, when the mode change condition has been fulfilled by the determinations of a hard pedaling determiner U1, a steady high load determiner U2, and a steady low load determiner U3 shown in FIG. 6, the control mode manager 31 performs the mode change at the mode change approval position. On the other hand, when the mode change condition has been fulfilled by the determinations of a high load start determiner U4 and a rapid load decrease determiner U5 shown in FIG. 6, the control mode manager 31 performs the mode change irrespective of the crank position. As described above, for the bicycle 100, in the predetermined riding situation, the mode change (the change in assist ratio) is performed when the crank position is located at the mode change approval position, and in another riding situation, the mode change (the change in assist ratio) is performed irrespective of the crank position. This enables the mode change (the change in assist ratio) to be performed at the most suitable time point for the riding situation. The determiners U1 through U5 will be described below in detail.

The mode change condition includes a condition related to the pedaling force. The pedaling force determiner 31C determines whether or not the mode change condition is fulfilled based on the pedaling force detected by the torque sensor 41. Specifically, the pedaling force determiner 31C determines whether or not the local maximum of the pedaling force (i.e., the peak pedaling force) in one pedaling motion or a plurality of pedaling motions, an average of the pedaling force in the one pedaling motion or the plurality of pedaling motions, and so on are higher than the threshold value, or whether or not the local maximum and average are lower than the threshold value. Hereinafter, the local maximum, the average and so on of the pedaling force used in the determination are collectively referred to as a "determined pedaling force."

As shown in FIG. 6, the pedaling force determiner 31C includes a determination pedaling force calculator 31D. The determination pedaling force calculator 31D calculates the determination pedaling force to be used in the determination of the mode change condition based on the output of the torque sensor 41. As shown in FIG. 6, the pedaling force determiner 31C includes the hard pedaling determiner U1, the steady high load determiner U2, the steady low load determiner U3, the high load start determiner U4, and the rapid load decrease determiner U5. Each of the determiners U1 through U5 determines whether or not the mode change condition is fulfilled by one or more of the determination pedaling force calculated by the determination pedaling force calculator 31D.

The following are types of the determination pedaling forces:
- a local maximum (a peak pedaling force, e.g., Pk1 in FIG. 7) of the pedaling force in one pedaling motion;
- a local minimum (e.g., Bt1 in FIG. 7) of the pedaling force in one pedaling motion;
- local maxima (a plurality of consecutive peaks of the pedaling force, e.g., Pk1, Pk2 and Pk3 in FIG. 7) of the pedaling force in a plurality of consecutive pedaling motions;
- local minima (e.g., Bt1, Bt2, Bt3 and Bt4 in FIG. 7) of the pedaling force in a plurality of consecutive pedaling motions;
- a moving average (e.g., an average of Pk1, Pk2 and Pk3 in FIG. 7) of local maxima of the pedaling force in a plurality of consecutive pedaling motions;
- a moving average (e.g., an average of Bt1, Bt2, Bt3 and Bt4 in FIG. 7) of local minima of the pedaling force in a plurality of consecutive pedaling motions; and
- an average (e.g., Md1 in FIG. 7, hereinafter referred to as a "middle pedaling force") of the pedaling force in one pedaling motion.

In the bicycle 100, the middle pedaling force is an average of the pedaling force between, for example, the time point when the crank angle change from when the peak pedaling force is obtained has reached 90 degrees, and the time point when the crank angle change from when the subsequent peak pedaling force is obtained has reached 90 degrees.

an average (e.g., an average of Md1, Md2, and Md3 in FIG. 7) of the middle pedaling forces in a plurality of pedaling motions; and instantaneous values (e.g., the pedaling force at a predetermined crank position, e.g., C1, C2 in FIG. 7) of the pedaling force.

The pedaling force determiner 31C (specifically, the hard pedaling determiner U1, the steady high load determiner U2, and the high load start determiner U4) determines whether or not at least one of the determination pedaling forces described above is higher than the threshold value. Then, in the case in which the determination pedaling force is higher than the threshold value, the control mode change manager 31 changes the control mode toward the upside (i.e., the control mode is changed to a mode closer to the "high mode" in the bicycle 100). The mode change conditions determined by the determiners U1, U2m, and U4 are different from each other, and thus when it is determined that the mode change condition has been fulfilled in any one of the determiners U1, U2, and U4, the control mode manager 31 changes the control mode toward the upside. In the example shown in FIG. 7, the peak pedaling force Pk1 exceeds the threshold value Th11. Therefore, the control mode manager 31 changes the control mode toward the upside at the time point (t4) when the crank angle change from the peak pedaling force Pk1 has reached 90 degrees.

Further, the pedaling force determiner 31C (specifically, the steady low load determiner U3 and the rapid load decrease determiner U5) determines whether or not at least one of the determination pedaling forces described above is lower than the threshold value. Then, in the case in which the determination pedaling force is lower than the threshold value, the control mode change manager 31 changes the control mode toward the downside (i.e., the control mode is changed to a mode closer to the super ECO mode). The mode change conditions determined by the determiners U3 and U5 are different from each other, and thus when it is determined that the mode change condition has been fulfilled in either one of the determiners U3, U5, the control mode manager 31 changes the control mode toward the downside.

As described above, the control mode manager 31 includes the crank position determiner 31A that determines whether or not the crank position is located at the mode change approval position. Therefore, when the determination pedaling force to fulfill the mode change condition has been detected before the crank position reaches the mode change approval position, the mode change is performed after a delay from the time point when the determination pedaling force that fulfills the mode change condition has been detected. For example, in a case in which the mode change condition is when the peak pedaling force exceeds the threshold value, the mode change is performed after a delay from the time point when the peak pedaling force higher than the threshold value has been detected. Further, in a case in which the mode change condition is when the peak pedaling force falls below the threshold value, the mode change is performed after a delay from the time point when the peak pedaling force lower than the threshold value has been detected. For the bicycle 100, as described below, when the crank position reaches the mode change approval position, whether or not the detected peak pedaling force fulfills the mode change condition is determined. Then, the mode change will be made when the peak pedaling force fulfills the mode change condition.

It should be noted that the mode change conditions may be different depending on the control modes. For example, the threshold value for the determination pedaling forces provided for the mode change toward the upside may increase as the control mode increases (as the control mode approaches the high mode). The "threshold value for the determination pedaling forces provided for the mode change toward the upside" is a threshold value used in the determinations by the hard pedaling determiner U1, the steady high load determiner U2, and the high load start determiner U4.

Using FIG. 7 as an example, the threshold value Th11 provided for the mode change from the ECO mode to the standard mode may also be higher than the threshold value Th11 provided for the mode change from the super ECO mode to the ECO mode. Further, the threshold value Th11 provided for the mode change from the standard mode to the high mode may be higher than the threshold value Th11 provided for the mode change from the ECO mode to the standard mode. This enables the second mode change toward the upside to be prevented from occurring with excessive ease after the first mode change toward the upside is made.

Further, the threshold value for the determination pedaling forces provided for the mode change toward the downside may decrease as the control mode decreases (as the control mode approaches the super ECO mode). In the bicycle 100, the "threshold value for the determination pedaling forces provided for the mode change toward the downside" is a threshold value used in the determinations by the steady low load determiner U3 and the rapid load decrease determiner U5 described below. This enables the second mode change toward the downside to be prevented from occurring with excessive ease after the first mode change toward the downside is made.

In some cases, there is a manner of pedaling with a high average of the pedaling force and with a small change of the pedaling force (with a small amplitude of the pedaling force) that is referred to as "smooth pedaling motion". In the smooth pedaling motion, the peak pedaling force is low. Therefore, if the determination uses only the peak pedaling force in the smooth pedaling motion, an appropriate mode change may not be made. Therefore, the middle pedaling force (e.g., Md1 in FIG. 7) in one pedaling motion, or the average (e.g., the average of Md1, Md2, and Md3 in FIG. 7) of the middle pedaling forces in a plurality of pedaling motions may be used as the determination pedaling force as described above. As will be described below, in the bicycle 100, the middle pedaling force is used in the process performed by the steady low load determiner U3.

Further, the average of the local maxima (the peak pedaling forces) of the pedaling force in a plurality of consecutive pedaling motions, or the average of the local minima of the pedaling force may be used as the determination pedaling force. The average values may reduce the influence of a disturbance in the pedaling motion, the influence of a gear change in the change gear mechanism 27 and so on. As will be described below, in the bicycle 100, the average of the peak pedaling forces obtained in a plurality of consecutive pedaling motions is used in the processes performed by the steady high load determiner U2 and the steady low load determiner U3.

As described above, the control mode manager 31 provides a predetermined mode change disapproval period between two consecutively performed mode changes. The mode change disapproval period determiner 31E determines whether or not the mode change disapproval period has elapsed from the previous mode change. Even in the case in which the determination pedaling force fulfills the mode change condition, the control mode manager 31 does not perform the change of the control mode in the case in which the mode change disapproval period has not elapsed from the previous mode change.

For the bicycle 100, a plurality of mode change disapproval periods are defined which are different in length. Examples of the mode change disapproval periods are a period shorter than the time necessary to perform one pedaling motion, a period corresponding to one pedaling motion, and a period longer than the time necessary to perform one pedaling motion (e.g., a period corresponding to a plurality of pedaling motions). The mode change disapproval period determiner 31E selects a period among the plurality of mode change disapproval periods based on the riding situation of the bicycle 100 and performs the selected period between two consecutive mode changes. The mode change disapproval period determiner 31E determines whether or not the mode change disapproval period selected based on the riding situation of the bicycle 100 has elapsed from the previous mode change. Defining a plurality of periods as the mode change disapproval periods allows the mode change to be performed at an appropriate frequency in conformity with the riding situation. For example, in the case in which the bicycle 100 is rapidly accelerated, the control mode is able to change toward the upside in a stepwise manner at relatively short time intervals. On the other hand, in the case in which, for example, the bicycle 100 performs the steady movement, a longer time interval is provided between the changes of the control mode.

As shown in FIG. 6, in the bicycle 100, the mode change disapproval period determiner 31E includes a hard-pedaling_period determiner V1, a steady_period determiner V2, a start_period determiner V4, and a load-rapid-decrease_period determiner V5. The determiners V1, V2, V4, and V5 include mode change disapproval periods having different lengths. The determiners V1, V2, V4, and V5 respectively correspond to the hard pedaling determiner U1, the steady high load determiner U2, the steady low load determiner U3, the high load start determiner U4, and the rapid load decrease determiner U5 of the pedaling force determiner 31C. Specifically, the hard-pedaling period determiner V1 determines whether or not the mode change disapproval period (e.g., a period corresponding to the one pedaling motion) has elapsed from the previous mode change in the case in which it has been determined that the determination pedaling force has fulfilled the mode change condition in the hard pedaling determiner U1. The steady_period determiner V2 determines whether or not the mode change disapproval period has elapsed from the previous mode change in the case in which it has been determined that the determination pedaling force has fulfilled the mode change condition in the steady high load determiner U2 and the steady low load determiner U3. Further, the start_period determiner V4 determines whether or not the mode change disapproval period has elapsed from the previous mode change in the case in which it has been determined that the determination pedaling force has fulfilled the mode change condition in the high load start determiner U4. Further, the load-rapid-decrease_period determiner V5 determines whether or not the mode change disapproval period has elapsed from the previous mode change in the case in which it has been determined that the determination pedaling force has ful- filled the mode change condition in the rapid load decrease determiner U5. The periods provided for the respective period determiners V1, V2, V4, and V5 will be described below in detail.

In the bicycle 100, the plurality of mode change disapproval periods may include a period defined by time and may include a period defined by the number of pedaling motions (in other words, the crank angle change). In the case in which the mode change disapproval period is defined by the number of pedaling motions, the mode change disapproval period determiner 31E counts the crank angle change from the previous mode change, and determines whether or not the crank angle change thus counted has reached a threshold value corresponding to the mode change disapproval period when the pedaling force determiner 31C (specifically, the determiners U1, U2, and U3) determines that the determination pedaling force has fulfilled the mode change condition.

In the example of FIG. 7, three pedaling motions (180 degrees×3) is defined as the mode change disapproval period. The peak pedaling forces Pk2, Pk3 in the two pedaling motions subsequent to the mode change (t4) toward the upside exceed the threshold value Th11. However, since the mode change disapproval period has not elapsed at the time point when these peak pedaling forces Pk2, Pk3 are obtained, the mode change has not been performed. Further, the subsequent peak pedaling force Pk4 also exceeds the threshold value Th11. Three pedaling motions have been performed after the previous mode change at the time point (t5) at which the crank angle change reaches 90 degrees from the crank position where the peak pedaling force Pk4 has been obtained. Therefore, the control mode is further changed toward the upside at t5.

Defining the mode change disapproval period by the number of pedaling motions (in other words, the crank angle change) allows the mode change disapproval period to elapse early and allows the mode change to be made at short time intervals in the case in which the rotational speed of the crank shaft 2 is high (in the case in which the pedaling rate is high), compared to the case in which the rotational speed of the crank shaft 2 is low. As a result, it is possible to perform the mode change at an appropriate frequency in conformity with the manner of pedaling.

Although the three pedaling motions are defined as the mode change disapproval period in the example of FIG. 7, the mode change disapproval period may be defined as a smaller number of pedaling motions than three, or may also be defined as a larger number of pedaling motions than three. In the bicycle 100, the mode change disapproval periods used in the hard-pedaling period determiner V1 and the steady_period determiner V2 are each defined by the number of pedaling motions.

Further, in the bicycle 100, some of the mode change disapproval periods are defined by time. Specifically, a shorter period than the period corresponding to the one pedaling motion is defined by time as the mode change disapproval periods used in the start_period determiner V4 and the load-rapid-decrease period determiner V5. For example, in some cases, the pedaling rate is as low as about 30 rpm when starting the bicycle. In this case, the one pedaling motion, that is, motion of the pedal from the uppermost position to the lowermost position, takes about one second. Therefore, a shorter time than about one second is defined as the mode change disapproval period for starting, for example. The mode change disapproval period defined by time as described above allows a plurality of mode changes to be made at relatively short time intervals irrespective of the pedaling rate.

It should be noted that the mode change disapproval periods are not limited to those in the bicycle 100. For example, all of the plurality of mode change disapproval periods may be defined by the number of pedaling motions or the crank angle change. Alternatively, all of the plurality of mode change disapproval periods may be defined by time.

In the bicycle 100, an operator (e.g., a rider or a maintenance staff for the bicycle 100) are able to adjust the ease in which the mode changes occur. The mode change condition adjuster 31F receives an instruction input through, for example, the operation input 58, and then adjusts the mode change condition based on the instruction. Specifically, the change condition modifier 31F adjusts the threshold values used in the process of the pedaling force determiner 31C. Adjusting the threshold values as described above allows the mode change to be made at an appropriate time point irrespective of a difference in the physical constitution among riders or the like.

FIG. 8 is a table for explaining the process performed by the mode change condition adjuster 31F. As shown in the drawing, a plurality of levels are provided for each of the threshold values. Each level includes a plurality of threshold values used in the respective determiners U1 through U5. FIG. 8 exemplifies threshold values used in the hard pedaling determiner U1, the steady high load determiner U2, and the steady low load determiner U3. The threshold values are stored in the memory of the controller 30 in advance, in which the threshold values correspond to each of the levels. The mode change condition adjuster 31F selects one of the levels based on the instruction input through the operation input 58. In other words, the mode change condition adjuster 31F selects the plurality of threshold values provided for each level as a group based on the instruction input through the operation input 58. The pedaling force determiner 31C determines whether or not the mode change condition is fulfilled using the threshold values included in the selected level. The bicycle 100, which allows the plurality of threshold values to be selected as a group by selecting a level, facilitates the adjustment operation of the threshold values.

The instruction to the mode change condition adjuster 31F is not limited to an instruction input through the operation input 58. For example, an external device such as an information processor may be available that is used by a maintenance agency of the bicycle 100 to be connectable to the controller 30. In this case, the mode change condition adjuster 31F may select one of the levels defining the threshold values based on the instruction input from that information processor. Further, the threshold values may not be adjusted as a group. Taking FIG. 8 as an example, the threshold value used in the hard pedaling determiner U1, the threshold value used in the steady high load determiner U2, and the threshold value used in the steady low load determiner U3 may be individually adjusted.

In the bicycle 100, the operator (e.g., the rider or the maintenance staff for the bicycle 100) may be able to limit the control mode available to the controller 30. The available mode limiter 31G may receive an instruction input through, for example, the operation input 58 to limit, based on the instruction, the control mode to be selected by the control mode manager 31. In the bicycle 100, the available mode limiter 31G may restrict, for example, the selection of the high mode, or the selection of the super ECO mode. In other words, the available mode limiter 31G may restrict the selection of the control mode with the highest assist ratio, or may restrict the selection of the control mode with the lowest assist ratio. In the case in which the available mode limiter 31G has restricted the selection of, for example, the super ECO mode, the control mode manager 31 performs the mode change among the other three control modes. In the case in which the available mode limiter 31G has restricted the selection of, for example, the high mode, the control mode manager 31 performs the mode change among the other three control modes. In other words, in the case in which the available mode limiter 31G has limited the control mode available for the control mode manager 31, the control mode manager 31 performs the mode change among the other control modes. This function enables the electric motor 21 to drive only in control modes that suit the rider's preference.

The instruction to the available mode limiter 31G is not limited to an instruction through the operation input 58. For example, an external device such as an information processor may be used by the maintenance agency of the bicycle 100 to be connectable to the controller 30. In this case, the available mode limiter 31G may restrict the selection of the control mode with the highest assist ratio, or may restrict the selection of the control mode with the lowest assist ratio, based on the instruction input from that information processor. Further, the control mode restricted by the available mode limiter 31G is not required to be the control mode with the highest assist ratio, or the control mode with the lowest assist ratio. The selection of the standard mode, or the selection of the ECO mode may be restricted by the available mode limiter 31G.

As described above, the control mode manager 31 includes the manual changer 31H. The manual changer 31H receives a change instruction on the control mode input from the operation input 58, and then changes the control mode based on the instruction. In the case of changing the control mode based on such an instruction input from the operation input 58, the mode change (the change of the assist ratio) may be made when the pedal 2a is located between the front limit position P2 and the rear limit position P3 shown in FIG. 5. Specifically, after receiving the change instruction on the control mode, the manual changer 31H may change the control mode when the crank position determiner 31A determines the crank position has reached the mode change approval position, for example, when the crank angle change after the peak pedaling force is obtained has reached a predetermined angle (e.g., 90 degrees).

Figure 9:
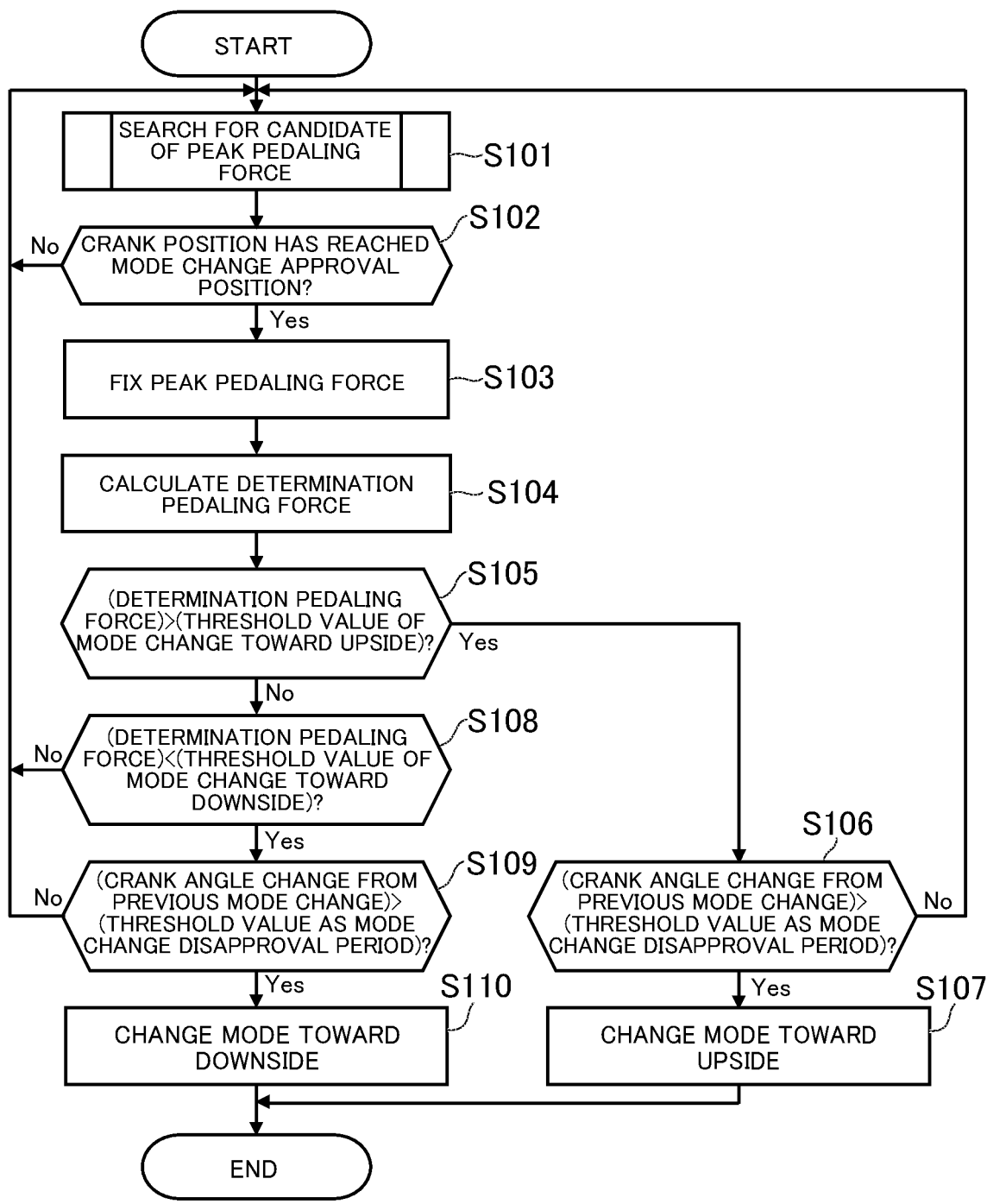
FIG. 9 is a flowchart showing an example of a process performed by the control mode manager provided to the controller.

FIG. 9 is a flowchart showing an example of the process performed by the control mode manager 31. The process shown in the drawing is repeatedly performed while the bicycle 100 is moving. The following description explains an example in which the mode change is made on the condition that the crank angle change after the peak pedaling force (that is, the crank angle change from the time point when a candidate of the peak pedaling force has been determined) has reached 90 degrees and that the mode change disapproval period has elapsed, as explained with reference to FIG. 7.

The control mode manager 31 searches for a candidate of the peak pedaling force (S101). The search for the peak pedaling force is able to be performed in, for example, the following manner. The pedaling force is detected with a predetermined period based on the output of the torque sensor 41, then the detected pedaling forces are compared to the candidate of the peak pedaling force already stored in the memory. In the case in which the detected pedaling force is higher than the candidate of the peak pedaling force already stored in the memory, the candidate of the peak pedaling force is updated with the higher pedaling force. In the case in which the detected pedaling force is lower than the candidate of the peak pedaling force having been stored in the memory, the candidate of the peak pedaling force is not updated. Accordingly, the local maximum (i.e., the peak pedaling force) of the pedaling force remains in the memory.

When the candidate of the peak pedaling force has been determined, the crank position determiner 31A determines whether or not the crank position has reached the mode change approval position (S102). Specifically, the crank position determiner 31A determines whether or not the crank angle change from the time point when the candidate of the peak pedaling force has been determined has reached a predetermined angle (specifically 90 degrees). Then, when the crank angle change has reached the predetermined angle, more specifically when the crank position has reached the mode change approval position, it is determined by using the peak pedaling force stored in the memory whether or not the mode change condition is fulfilled. In other words, every time the candidate of the peak pedaling force is determined (i.e., every time the local maximum of the pedaling force is obtained), the control mode manager 31 starts counting the crank angle change, and then determines whether or not the mode change condition is fulfilled when the crank angle change reaches 90 degrees.

The determination pedaling force calculator 31D sets the candidate of the peak pedaling force as the peak pedaling force when the crank angle change reaches 90 degrees (S103) and stores the set peak pedaling force in the memory. Then, the determination pedaling force calculator 31D calculates the determination pedaling force (S104). As described above, the determination pedaling force calculator 31D calculates, for example, an average (moving average) of the peak pedaling forces of a plurality of consecutive pedaling motions as the determination pedaling force. Further, the determination pedaling force calculator 31D calculates an average (i.e., the middle pedaling force) of the pedaling force in one pedaling motion, an average (moving average) of the middle pedaling forces in a plurality of consecutive pedaling motions and so on as the determination pedaling forces. Then the pedaling force determiner 31C determines whether or not the mode change condition is fulfilled based on the determination pedaling forces (including the set peak pedaling force).

Specifically, the pedaling force determiner 31C (the hard pedaling determiner U1 and the steady high load determiner U2 in the bicycle 100) determines whether or not each of the determination pedaling forces exceeds the threshold value for the mode change toward the upside (S105). In the case in which the determination pedaling forces exceed the respective threshold values, the mode change disapproval period determiner 31E (the hard-pedaling period determiner V1 and the steady_period determiner V2 in the bicycle 100) determines whether or not the mode change disapproval period defined by the number of pedaling motions (the crank angle change) has elapsed from the previous mode change (S106). In the case in which the number of pedaling motions (the crank angle change) defined as the mode change disapproval period has not elapsed, the control mode manager 31 returns to the process of S101 without performing the mode change. In contrast, in the case in which the number of pedaling motions defined as the mode change disapproval period has already elapsed, the control mode manager 31 performs the mode change toward the upside (S107).

In the case in which the determination pedaling force does not exceed the threshold value in the determination of S105, the pedaling force determiner 31C (the steady low load determiner U3 in the bicycle 100) determines whether or not the determination force falls below the threshold value for the mode change toward the downside (S108). In the case in which the determination pedaling force falls below the threshold value, the mode change disapproval period determiner 31E (the steady_period determiner V2 in the bicycle 100) determines whether or not the mode change disapproval period defined by the number of pedaling motions (the crank angle change) has elapsed from the previous mode change (S109). In the case in which the number of pedaling motions (the crank angle change) defined as the mode change disapproval period has not elapsed, the control mode manager 31 returns to the process of S101 without performing the mode change. In contrast, in the case in which the number of pedaling motions defined as the mode change disapproval period has already elapsed, the control mode manager 31 performs the mode change toward the downside (S110).

According to the process of the control mode manager 31 shown in FIG. 9, the mode change is performed when the crank angle change from the time point when the peak pedaling force is obtained has reached 90 degrees and the mode change disapproval period defined by the number of pedaling motions (the crank angle change) has elapsed, as is described with reference to FIG. 7.

It should be noted that the process performed by the control mode manager 31 is not limited to the example of FIG. 9.

For example, in contrast to the example of FIG. 9, after it is determined whether or not the mode change disapproval period defined by the number of pedaling motions (the crank angle change) has elapsed from the previous mode change (S106, S109), the process of comparison (S105, S108) between the determination pedaling force and the threshold value may be made only in the case in which the mode change disapproval period has already elapsed.

As still another example, when the crank rotation sensor 45 is a sensor that detects the angular position (the angular position) of the crank shaft 2, the pedaling force detected when the pedal 2a is located at the horizontal position P4 may be used as the peak pedaling force.

In the example of FIG. 9, when the crank angle change reaches 90 degrees after the candidate (the local maximum of the pedaling force) of the peak pedaling force is detected, the peak pedaling force is set (S103), the determination pedaling force is calculated (S104), and whether or not the determination pedaling force fulfills the mode change condition is determined (S105, S108). However, the process of S103, S104, S105, and S108 may be performed before the crank angle change reaches 90 degrees after the local maximum of the pedaling force is detected. For example, when the pedaling force decreases by a predetermined proportion (e.g., 20% or 30%) from the local maximum after the local maximum is detected, the peak pedaling force may be set, the determination pedaling force may be calculated, and whether or not the determination pedaling force fulfills the mode change condition may be determined. Then, the mode change may be made when the crank angle change reaches 90 degrees after the local maximum of the pedaling force is detected.

As still another example, the determination on whether or not the mode change condition is fulfilled may be performed every time the pedaling force is detected. For example, when the mode change condition is when the pedaling force exceeds the threshold value, the determination whether or not the pedaling force is higher than the threshold value may be made every time the pedaling force is detected.

The hard pedaling determiner U1, the steady high load determiner U2, the steady low load determiner U3, the high load start determiner U4, and the rapid load decrease determiner U5 shown in FIG. 6 will hereinafter be described. It should be noted that the types of the threshold values and the mode change disapproval periods provided for the determiners U1 through U5 are illustrative only, and may arbitrarily be modified.

Figure 10:
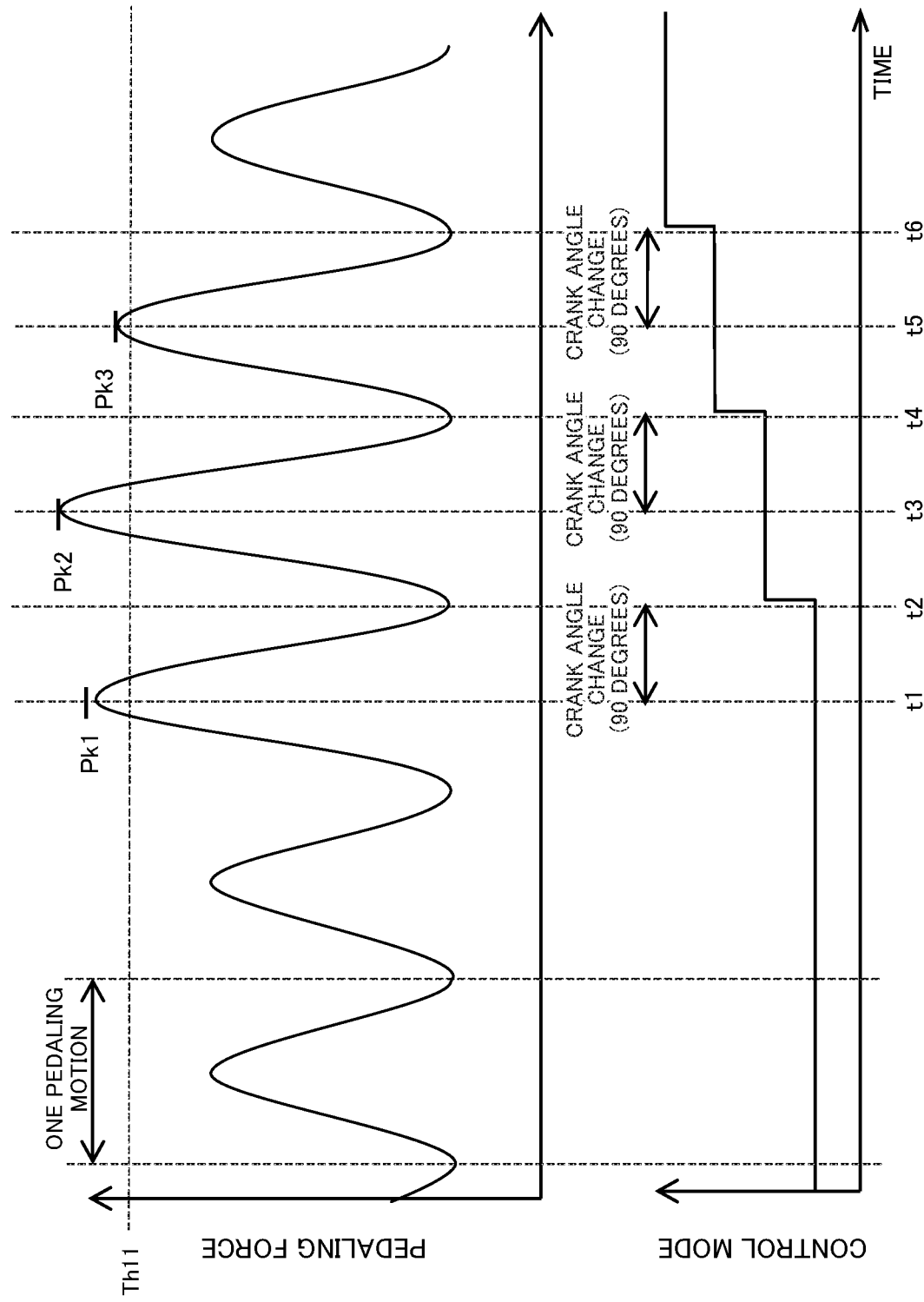
FIG. 10 is a timing chart for explaining an example of a process performed by a hard pedaling determiner.

The bicycle may be pedaled hard such as the cases of making sudden acceleration or climbing a steep slope. The hard pedaling determiner U1 determines these cases. For example, the hard pedaling determiner U1 determines whether or not the peak pedaling force is higher than the threshold value (hereinafter the threshold value is referred to as a hard pedaling determination threshold value). FIG. 10 is a timing chart for explaining an example of a process performed by the hard pedaling determiner U1. The hard pedaling determiner U1 determines whether or not each of the peak pedaling forces is higher than the hard pedaling determination threshold value Th11. In the example of this drawing, since the peak pedaling force Pk1 at t1 is higher than the hard pedaling determination threshold value Th11, the control mode is changed toward the upside at the time point t2 when the crank angle change has reached 90 degrees after t1. Further, in the example of this drawing, since the peak pedaling force Pk2 at t3 is also higher than the hard pedaling determination threshold value Th11, and the peak pedaling force Pk3 at t5 is also higher than the hard pedaling determination threshold value Th11, the control mode is changed toward the upside at the time point t4 when the crank angle change has reached 90 degrees after t3, and further, the control mode is changed further toward the upside at the time point t6 when the crank angle change has reached 90 degrees after t5.

It the example of FIG. 10, the mode change disapproval period for the hard pedaling determiner U1 is set as one pedaling motion (corresponding to the crank angle change of 180 degrees). Since the angle between the crank position at t2 and the crank position at t4 is 180 degrees, and the angle between the crank position at t4 and the crank position at t6 is 180 degrees, it is able to change the control mode toward the upside at each of t4, t6. The mode change disapproval periods set in such a manner allow the control mode to change toward the upside every one pedaling motion of the pedal 2a as shown in FIG. 10.

In some cases, the bicycle moves under a steady high load. For example, the bicycle may move on a gentle rising slope and may move against the wind. The steady high load determiner U2 determines such movement. For example, the steady high load determiner U2 uses the peak pedaling forces of the plurality of consecutive pedaling motions, and the average of those peak pedaling forces as the determination pedaling forces. Then, the steady high load determiner U2 determines whether or not each of the peak pedaling forces of the plurality of consecutive pedaling motions is higher than a threshold value, and whether or not the average of those peak pedaling forces is higher than a threshold value (hereinafter, these two threshold values are referred to as an "one-pedaling_high load determination threshold value" and an "average_high load determination threshold value").

Figure 11:
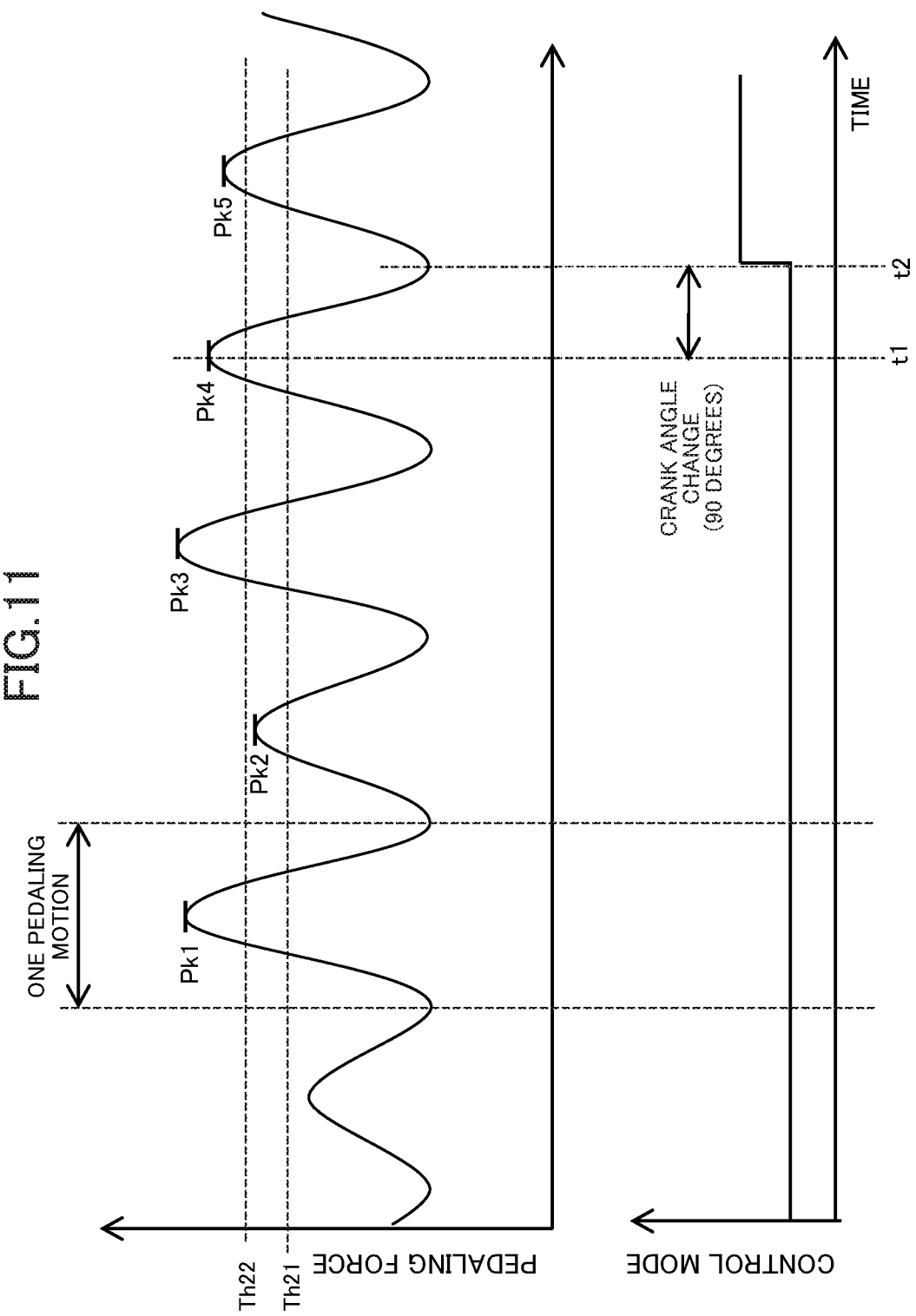
FIG. 11 is a timing chart for explaining an example of a process performed by a steady high load determiner.

FIG. 11 is a timing chart for explaining an example of the process performed by the steady high load determiner U2. The steady high load determiner U2 determines whether or not each of the plurality of (e.g., four) consecutive peak pedaling forces Pk1, Pk2, Pk3 and Pk4 is higher than the one-pedaling _high load determination threshold value Th21. Further, the steady high load determiner U2 determines whether or not the average (moving average) of the plurality of (e.g., four) consecutive peak pedaling forces Pk1, Pk2, Pk3 and Pk4 is higher than the average_high load determination threshold value Th22. In the example of this drawing, the peak pedaling force Pk4 obtained at t1 fulfills the two conditions described above, and thus the control mode is changed toward the upside at the time point t2 when the crank angle change has reached 90 degrees after t1.

As shown in FIG. 6, the mode change disapproval period determiner 31E has the steady_period determiner V2 for the steady high load determiner U2. The steady_period determiner V2 determines whether or not the plurality of pedaling motions (n pedaling motions) has elapsed from the previous mode change. In other words, the steady_period determiner V2 determines whether or not the crank angle change from the previous mode change has reached n×180 degrees. In the bicycle 100, the four pedaling motions (corresponding to the crank angle change of 720 degrees) is set as the mode change disapproval period for the steady_period determiner V2. Therefore, although the peak pedaling force Pk5 is also higher than the one-pedaling_high load determination threshold value Th21 and the average_high load determination threshold value Th22, the mode change due to the peak pedaling force Pk5 is not performed.

As described above, the steady high load determiner U2 uses the plurality of consecutive peak pedaling forces and the average of those pedaling forces are used as the determination pedaling forces. Using the average of the peak pedaling forces prevents the change of the pedaling force due to a disturbance in pedaling motions of the rider and due to a gear change of the change gear mechanism 27 from affecting the determination for the mode change.

The determination process of the steady high load determiner U2 is not limited to the example described above. For example, the average of the plurality of consecutive peak pedaling forces Pk1, Pk2, Pk3 and Pk4 may not be used in the determination. As still another example, the average (i.e., the "middle pedaling force" described above) of the pedaling force in one pedaling motion, or the average of the middle pedaling forces in a plurality of consecutive pedaling motions may be compared with the threshold value in the determination process of the steady high load determiner U2.

In the bicycle 100, the one-pedaling_high load determination threshold value Th21 is lower than the average_high load determination threshold value Th22 as shown in FIG. 11. The two threshold values allows the determination to be appropriately performed even in the case in which the pedaling force of the right leg and the pedaling force of the left leg are different from each other. Specifically, if the one-pedaling_high load determination threshold value Th21 is equal to the average_high load determination threshold value Th22, the following problems may occur. For example, as the pedaling force of the right leg is lower than the pedaling force of the left leg, the determination condition of the steady high load determiner U2 may not be fulfilled and, thus, the mode change may not be performed for a long period. The one-pedaling high load determination threshold value Th21 that is lower than the average_high load determination threshold value Th22 prevents such a problem.

In some cases, the bicycle moves with a steady low load. For example, the bicycle may move on a downward slope and may move with the wind. The steady low load determiner U3 determines such movement. For example, the steady low load determiner U3 determines whether or not each of the peak pedaling forces of the plurality of consecutive pedaling motions is lower than a threshold value, and whether or not the average of those peak pedaling forces is lower than a threshold value (hereinafter, these two threshold values are referred to as an "one-pedaling_low load determination threshold value" and an "average_low load determination threshold value"). Further, the steady low load determiner U3 determines whether or not the average (moving average) of the middle pedaling forces of a plurality of consecutive pedaling motions is lower than a threshold value (the threshold value is referred to as a "middle low load determination threshold value"). The "middle pedaling force" is the average of the pedaling force in one pedaling motion as described above. The control mode manager 31 performs the mode change toward the downside when, for example, all of these three conditions are fulfilled. As another example, the steady low load determiner U3 may determine whether or not each of the middle forces of a plurality of consecutive pedaling motions is lower than the threshold value.

Figure 12:
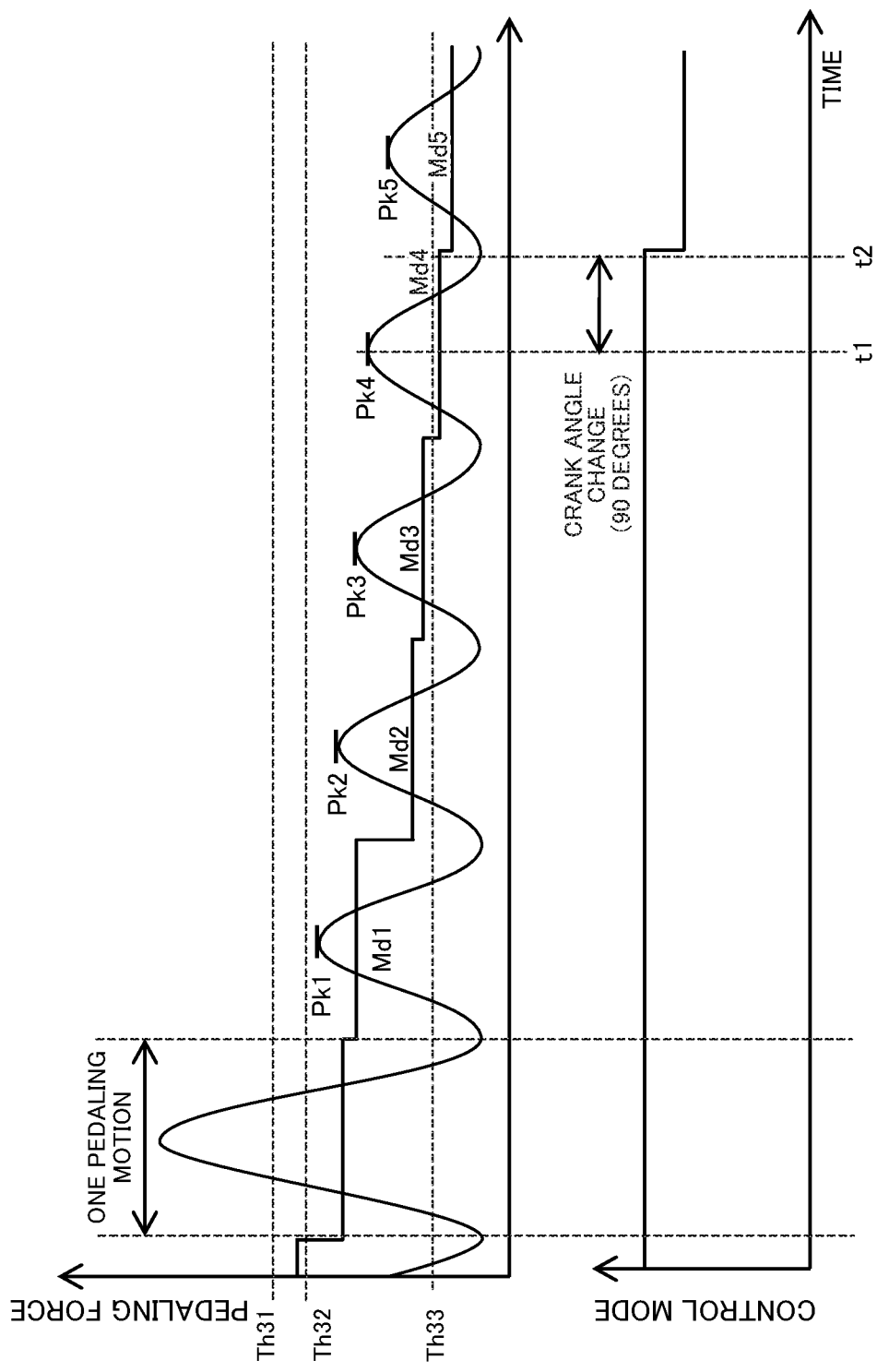
FIG. 12 is a timing chart for explaining an example of a process performed by a steady low load determiner.

FIG. 12 is a timing chart for explaining an example of the process performed by the steady low load determiner U3. The steady low load determiner U3 determines whether or not each of the plurality of (e.g., four) consecutive peak pedaling forces Pk1, Pk2, Pk3, and Pk4 is lower than the one-pedaling_low load determination threshold value Th31. Further, the steady low load determiner U3 determines whether or not the average (moving average) of the plurality of (e.g., four) consecutive peak pedaling forces Pk1, Pk2, Pk3, and Pk4 is higher than the average_low load determination threshold value Th32. Further, the steady low load determiner U3 determines whether or not the average (moving average) of the middle pedaling forces Md1, Md2, Md3, and Md4 of the plurality of consecutive pedaling motions is lower than the middle low load determination threshold value Th33. In the example of FIG. 12, all of the three conditions described above are fulfilled at the time point t2 when the peak pedaling force Pk4 is detected and the middle pedaling force Md4 is set. Then, at the time point (t2) when the crank angle change reaches 90 degrees after the time point t1 when the peak pedaling force Pk4 is detected, the crank shaft 2 reaches the mode change approval position, and the control mode is changed toward the downside.

As described above, the mode change disapproval period determiner 31E includes the steady_period determiner V2. When the mode change condition provided for the steady low load determiner U3 is fulfilled, the steady_period determiner V2 determines whether or not the plurality of pedaling motions (n pedaling motions) has elapsed from the previous mode change. Therefore, although the peak pedaling force Pk5 is also lower than the threshold values Th31, Th32, the mode change due to the peak pedaling force Pk5 is not performed.

As described above, in some cases, a smooth pedaling may be performed in which the change in pedaling force is small although the average of the pedaling force is high. If the determination using only the peak pedaling force is made during the smooth pedaling, an appropriate mode change may not be performed since the peak pedaling force is low during the smooth pedaling. For example, if the peak pedaling force is used alone in the determination of the steady low load determiner U3, the control mode is changed toward the downside despite that the average of the pedaling force is high during such smooth pedaling. In contrast, in the bicycle 100, since the middle pedaling force is used in the determination of the steady low load determiner U3, it is possible to prevent the control mode from being changed more frequently than necessary even during such smooth pedaling.

The determination using the middle pedaling force may be made also in the steady high load determiner U2. That is, the steady high load determiner U2 may determine whether or not each of the middle pedaling forces of the plurality of consecutive pedaling motions is higher than the threshold value, and/or whether or not the average (moving average) of the middle pedaling forces of the plurality of consecutive pedaling motions is higher than the threshold value.

In the bicycle 100, the one-pedaling_low load determination threshold value Th31 is higher than the average_low load determination threshold value Th32 as shown in FIG. 12. The two threshold values set in such a manner enables the determination to be appropriately performed even when the pedaling force of the right leg and the pedaling force of the left leg are different from each other. Specifically, if the one-pedaling_low load determination threshold value Th31 is equal to the average_low load determination threshold value Th32, the following problem may occur. For example, as the pedaling force of the right leg is higher than the pedaling force of the left leg, the determination condition of the steady low load determiner U3 is not appropriately fulfilled and thus the mode change may not be performed. The one-pedaling_low load determination threshold value Th31 that is higher than the average_low load determination threshold value Th32 prevents such a problem.

In some cases, the rotational speed of the crank shaft 2 is low and a high load is applied to the bicycle when the bicycle starts to move on a steep rising slope, for example. The high load start determiner U4 determines such movement. For example, the high load start determiner U4 determines whether or not a higher pedaling force than a threshold value continues for a predetermined time or more (hereinafter, the threshold value is referred to as a "high load start threshold value," and the predetermined time is referred to as a "continuous time threshold value"). Then, when the time during which the higher pedaling force than the high load start threshold value continues reaches the continuous time threshold value, the control mode manager 31 changes the control mode toward the upside. Therefore, when the mode change condition is fulfilled in the process of the high load start determiner U4, the mode change is performed irrespective of whether the crank position is located at the mode change approval position.

Figure 13:
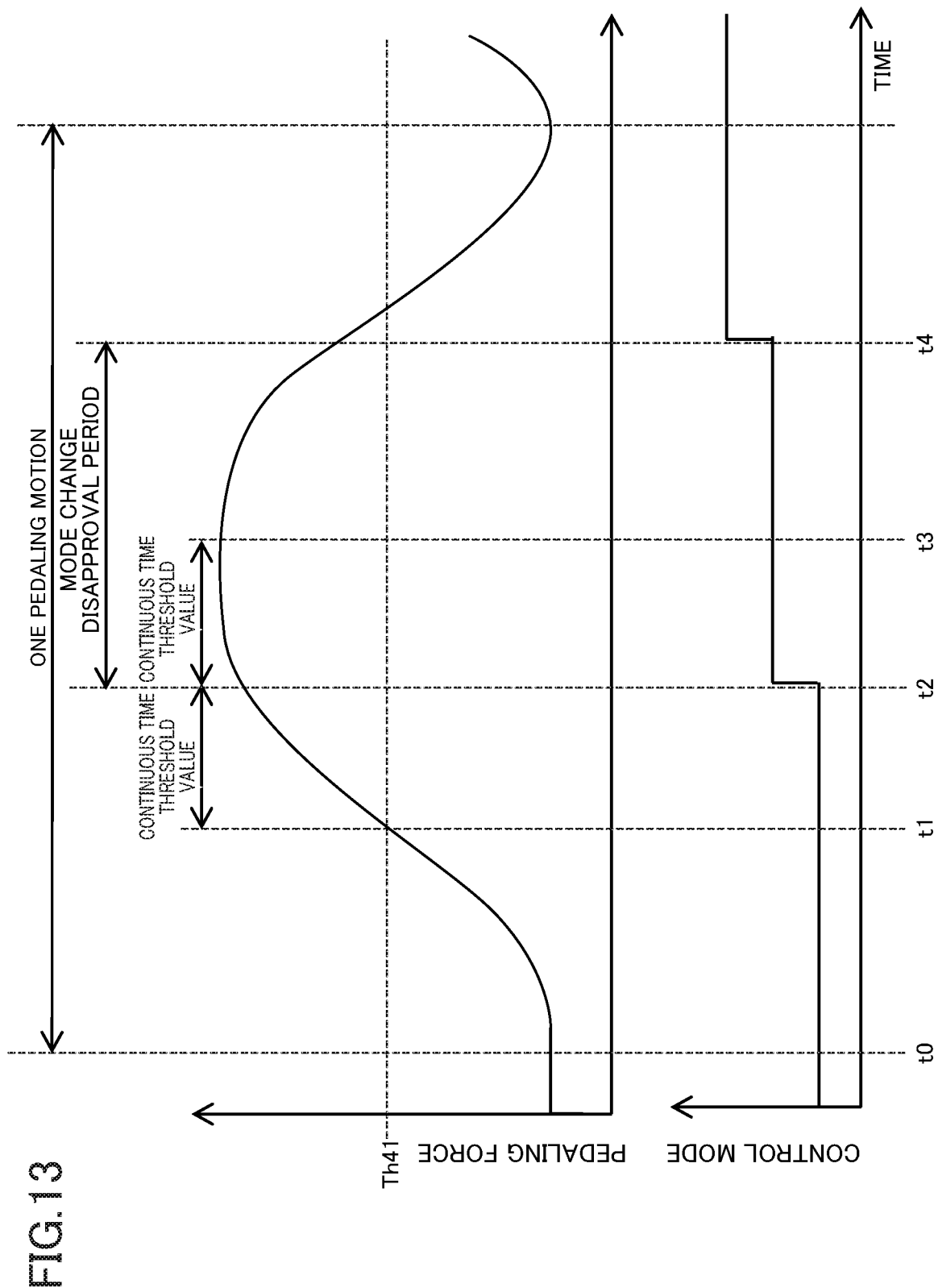
FIG. 13 is a timing chart for explaining an example of a process performed by a high-load start determiner.

FIG. 13 is a timing chart for explaining an example of the process performed by the high load start determiner U4. In the example of this drawing, the movement is started at t0, and the pedaling force has reached the high load start threshold value Th41 at t1. Subsequently, the pedaling force continues to rise, and then the continuous time from t1 reaches the continuous time threshold value at t2. Therefore, the control mode is changed toward the upside.

As described above, the mode change disapproval period determiner 31E includes the start_period determiner V4 for the high load start determiner U4. The start_period determiner V4 determines whether or not the mode change disapproval period defined in advance has elapsed from the previous mode change. In the bicycle 100, the mode change disapproval period for the high load start determiner U4 is defined by time, and is longer than the continuous time threshold value, and shorter than the time (not shorter than about 1 second) necessary for one pedaling motion during movement with a low pedaling rate. This causes the control mode to be promptly changed toward the upside even before the one pedaling motion is completed. The mode change disapproval period for the high load start determiner U4 is, for example, not less than about 0.3 seconds and not more than about 0.7 seconds. The mode change disapproval period is more preferably, for example, not less than about 0.4 seconds and not more than about 0.6 seconds. The mode change disapproval period is, for example, about 0.5 seconds. In the example of FIG. 13, the mode change toward the upside is performed at t2, the high pedaling force continues after t2, and the continuous time from the time point t2 reaches the continuous time threshold value at t3. However, since the elapsed time from the previous mode change does not reach the mode change disapproval period at t3, the mode change is not performed at t3. In the example of FIG. 13, the higher pedaling force than the high load start threshold value is kept after t3. The control mode is changed toward the upside (t4) when the elapsed time from the previous mode change (t2) has reached the mode change disapproval period.

The load can rapidly decrease when the bicycle has entered a downward slope, for example. The rapid load decrease determiner U5 determines such a movement. For example, the rapid load decrease determiner U5 determines whether or not a lower pedaling force than a threshold value continues for predetermined time or more (hereinafter, the threshold value is referred to as a "rapid load decrease determination threshold value," and the predetermined time is referred to as a "continuous time threshold value"). Then, when the continuous time of a pedaling force lower than the rapid load decrease determination threshold value has reached the continuous time threshold value, the control mode manager 31 changes the control mode toward the downside.

Figure 14:
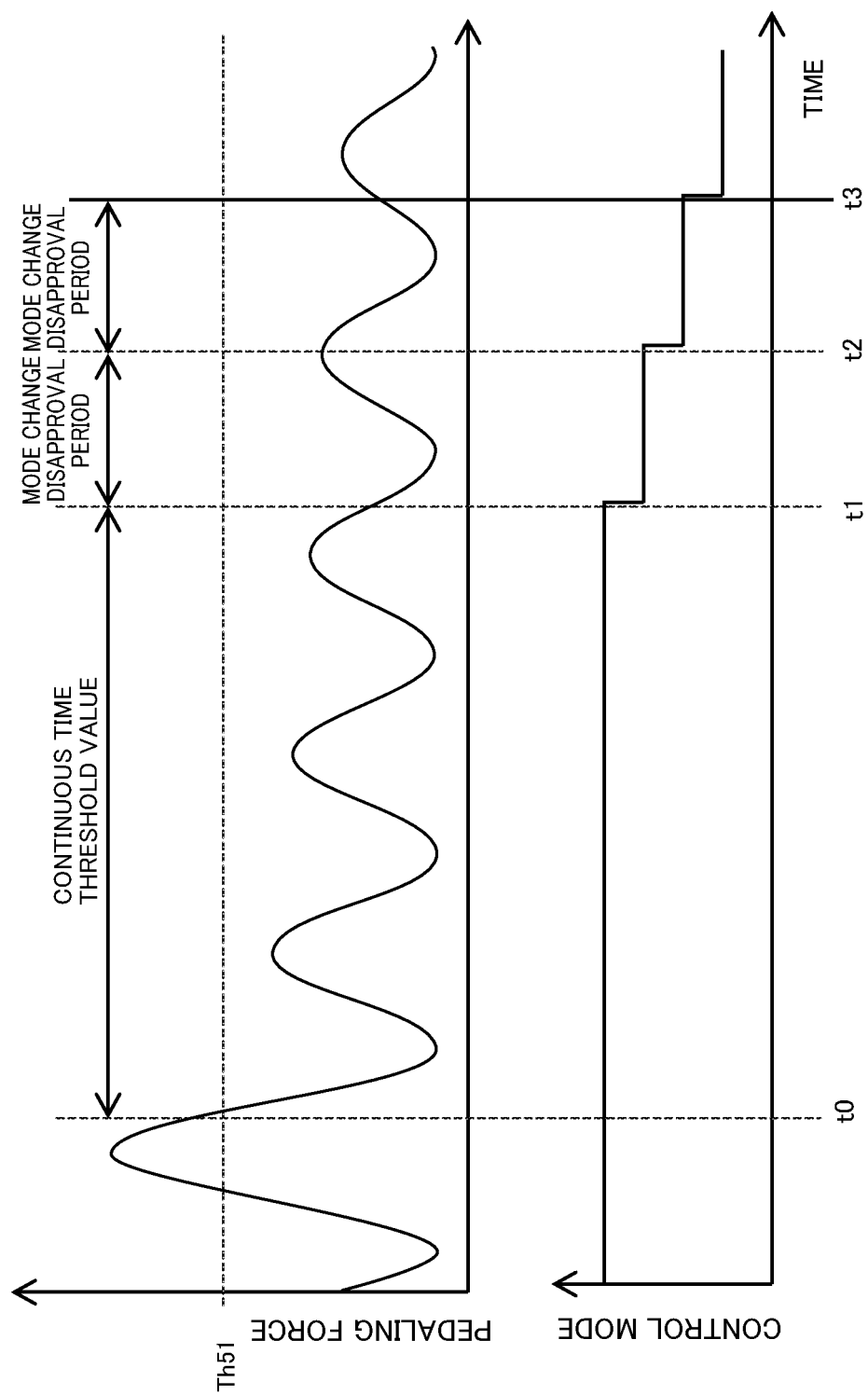
FIG. 14 is a timing chart for explaining an example of a process performed by a rapid load decrease determiner.

FIG. 14 is a timing chart for explaining an example of the process performed by the rapid load decrease determiner U5. In the example of this drawing, the pedaling force has reached the rapid load decrease determination threshold value Th51 at t0. In the subsequent pedaling, the lower pedaling force than the rapid load decrease determination threshold value Th51 is output. Accordingly, the lapsed time after the time point when the pedaling force has reached the rapid load decrease determination threshold value Th51 has reached the continuous time threshold value at t1. Therefore, the control mode is changed toward the downside.

As described above, the mode change disapproval period determiner 31E has the load-rapid-decrease_period determiner V5. The load-rapid-decrease_period determiner V5 determines whether or not the mode change disapproval period defined in advance has elapsed after the previous mode change. The mode change disapproval period for the rapid load decrease determiner U5 is also defined by time. For example, the mode change disapproval period is longer than the time necessary for one pedaling motion. Further, the mode change disapproval period for the rapid load decrease determiner U5 may also be defined by the number of pedaling motions (the crank angle change). The mode change disapproval period for the rapid load decrease determiner U5 may also be defined by both time and the number of pedaling motions. In the example of FIG. 14, the lower pedaling force than the rapid load decrease determination threshold value Th51 is output after t1, and the control mode is changed toward the downside when the elapsed time from the previous mode change (t1) has reached the mode change disapproval period (t2).

As is described above, the controller 30 includes, as the control of the electric motor 21, the plurality of control modes in which the assist ratios different from each other are calculated, and stores the mode change conditions for changing the control mode. The controller 30 performs the mode change when the pedal 2a (in other words, the crank position corresponding to the position of the pedal) is located between the angular position P3 (FIG. 5) that follows by 45 degrees the lowermost position of the locus of the pedal and the angular position P2 (FIG. 5) that precedes by 45 degrees the lowermost position. According to this configuration, the mode change is able to be made when the pedaling force exerted by the rider is relatively low. As a result, it is possible to prevent the uncomfortable feeling due to the rapid change of the load applied to the rider.

It should be noted that in the bicycle 100, the "mode change conditions" may be not only conditions related to the riding situation such as the pedaling force and the vehicle speed, but also conditions that the mode change instruction by the rider is input to the controller 30 via the operation input 58. In other words, when the mode change instruction has been input to the controller 30 via the operation input 58, it is determined that the "mode change conditions" have been fulfilled, and the control mode is changed. In the bicycle 100, the controller 30 includes the automated changer 31B and the manual changer 31H. Unlike the bicycle 100, the controller 30 may not have one of the automated changer 31B and the manual changer 31H. For example, the controller 30 may not have the manual changer 31H, or may not have the automated changer 31B.

The controller 30 is configured or programmed to perform the mode change after a delay from the time point when a pedaling force to fulfill the mode change conditions has been fulfilled. According to this configuration, since the time point at which whether or not the mode change conditions are fulfilled is determined is shifted from the time point at which the mode change is performed, it is possible to appropriately select both time points.

The controller 30 is configured or programmed to perform the mode change from the first mode to the second mode at an angular position determined based on a pedaling force detected through by the torque sensor 41. According to this configuration, a dedicated sensor to detect the angular position (an absolute value) of the crank shaft becomes unnecessary, and a reduction of the cost or a reduction of the number of components is achieved.

The controller 30 is configured or programmed to perform the mode change at the angular position that follows by the predetermined angle (e.g., 90 degrees) the angular position at which the pedaling force detected by the torque sensor 41 is a local maximum value in the range from the uppermost position P0 to the lowermost position P1 of the locus Lo of the pedal 2a. According to this configuration, a dedicated sensor to detect the angular position (an absolute value) of the crank shaft 2 becomes unnecessary, and it is possible to achieve a reduction of the cost or a reduction of the number of components.

The bicycle 100 includes the display 59 to show the current control mode. According to this configuration, it becomes possible for the rider to correctly figure out the current control mode, and the convenience of the rider is improved.

The controller is configured or programmed to use, in the first mode, the first map defining the relationship between the pedaling force applied to the pedal and the assist ratio. The controller is configured or programmed to use, in the second mode, the second map defining the relationship between the pedaling force applied to the pedal and the assist ratio.

The controller 30 is configured or programmed to provide the predetermined mode change disapproval period between two consecutive mode changes. In other words, the controller 30 provides the mode change disapproval period between a mode change from one of the plurality of modes to another mode, and a subsequent mode change. According to this configuration, the frequency of the mode changes is performed at appropriate times.

The mode change disapproval period is shorter than the time necessary to make one pedaling motion with the pedal 2a. According to this configuration, the mode changes are performed at short time intervals during movement in which, for example, a high load is applied and the rotational speed of the crank shaft is low (e.g., when starting to climb a slope).

The mode change disapproval period is equal to, longer than, the time necessary to one pedaling motion with the pedal 2a. According to this configuration, it is possible to prevent the frequency of the mode changes from becoming higher than necessary.

The first disapproval period (e.g., the period corresponding to the one pedaling motion) and the second disapproval period (e.g., the period corresponding to a plurality of pedaling motions) that is longer than the first disapproval period are defined as the mode change disapproval periods. One of the first disapproval period and the second disapproval period is provided between two mode changes based on the riding situation of the bicycle 100. Thus, the mode change is performed at an appropriate frequency corresponding to the riding situation. For example, when the bicycle 100 is rapidly accelerated, the control modes change in a stepwise manner at relatively short time intervals. On the other hand, when the bicycle performs steady movement, for example, the time intervals between the changes of the control mode are made longer.

The mode change disapproval period is defined by the number of pedaling motions or the rotation amount (the crank angle change) of the crank shaft 2. The controller 30 is configured or programmed to count the number of pedaling motions or the crank angle change to determine whether or not the mode change disapproval period has elapsed based on the number of pedaling motions or the crank angle change. According to this configuration, the mode changes are performed at relatively short time intervals in, for example, the movement state having a high pedaling rate. As a result, it is possible to perform the mode change at an appropriate frequency corresponding to the manner of pedaling.

The controller 30 is configured or programmed to determine whether or not the mode change condition is fulfilled based on the pedaling force detected by the torque sensor 41. Thus, the control mode is changed when a high load is applied to the rider, or when the load to be applied to the rider decreases.

As described above, the threshold value Th11 provided for the change from the ECO mode to the standard mode is higher than the threshold value Th11 provided for the change from the super ECO mode to the ECO mode. Further, the threshold value Th11 provided for the change from the standard mode to the high mode is higher than the threshold value Th11 provided for the change from the ECO mode to the standard mode. This configuration prevents the second mode change from being performed immediately after the first mode change has been performed.

In the controller 30, the mode change conditions (more specifically, the threshold values) are adjusted through the operation input 58. This configuration changes the control mode at the time point suitable for an individual rider.

The controller 30 is configured or programmed to receive an instruction from the operation input 58 to limit the control modes used by the controller 30 to one or more control modes. According to this configuration, the electric motor 21 is driven only with the control modes that suit the rider's preference.

A plurality of mode change conditions are provided in the controller 30. Further, the types of the pedaling forces used in the respective mode change conditions are different from each other. According to this configuration, since a plurality of types of values is used, the mode change is able to be made at a more appropriate time point than that in the case in which, for example, just one type is used alone. For example, a first mode change condition (e.g., the hard pedaling determination) is based on the local maximum of the pedaling force in one pedaling motion, and a second mode change condition (e.g., the steady low load determination) is based on the average of the pedaling force in the one pedaling motion. According to this configuration, even when the manner of pedaling (the manner of pedaling having a low local maximum) having small changes in the pedaling force is used, the control mode is able to be appropriately changed by using the second mode change condition.

The first mode change condition (e.g., the hard pedaling determination) is based on the pedaling force in one pedaling motion, and a second mode change condition (e.g., the steady high load determination) is based on the pedaling forces in a plurality of pedaling motions. According to this configuration, the control mode is changed in not only the case (the first mode change condition) in which a high load is instantaneously applied, but also the case (the second mode change condition) in which a high load is steadily applied.

The present invention is not limited to the preferred embodiments of the bicycle 100 described hereinabove. For example, the following modifications may be used.

The control mode manager 31 may not have the high load start determiner U4 and the rapid load decrease determiner U5 that enable the mode change when the pedal 2a is not located at the lowermost position P1 or close to the lowermost position P1.

Further, the determiners U1, U2, U3, U4, and U5 of the pedaling force determiner 31C may use the local minimum of the pedaling force, in addition to, or instead of, the peak pedaling forces.

Further, the mode change disapproval period may be provided for either one of the mode change toward the upside and the mode change toward the downside. For example, the mode change disapproval period may be provided only for the mode change toward the upside. In contrast, the mode change disapproval period may be provided for only the mode change toward the downside.

As described above, a plurality of assist ratio maps may be associated with one control mode. In this case, the change of the assist ratio map in each control mode may be made when the pedal 2a is located at the lowermost position P1 or close to the lowermost position P1. In this case, each of the assist ratio maps corresponds to the control mode described above.

Further, the control mode currently selected may not be shown on the display 59. In this case, the assist ratio maps used by the controller 30 define control modes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive system for an electric assist bicycle, the drive system comprising:
   a sensor that detects a pedaling force applied to a pedal from a rider;
   an electric motor that outputs a drive power to assist a pedaling motion of the rider; and
   a controller configured or programmed to calculate an assist ratio provided by the electric motor; wherein
   the controller includes a plurality of control modes for the electric motor, including a first mode and a second mode having different assist ratios, and determines whether or not a mode change condition is fulfilled in which the mode change condition is defined as a mode change from the first mode to the second mode; and
   the controller performs the mode change from the first mode to the second mode when the pedal is located between a first angular position that follows by 45 degrees a lowermost position of a locus of the pedal and a second angular position that precedes by 45 degrees the lowermost position.

2. The drive system for the electric assist bicycle according to claim 1, wherein
   the controller is configured or programmed to perform the mode change from the first mode to the second mode after a delay from a time point when the pedaling force fulfills the mode change condition.

3. The drive system for the electric assist bicycle according to claim 1, wherein
   the controller is configured or programmed to perform the mode change from the first mode to the second mode based on the pedaling force detected by the sensor.

4. The drive system for the electric assist bicycle according to claim 1, wherein
   the controller is configured or programmed to perform the mode change from the first mode to the second mode at an angular position at which a crank shaft rotates by a predetermined angle from a position at which the pedaling force is a local maximum value.

5. The drive system for the electric assist bicycle according to claim 1, further comprising:
   a display that shows a current control mode.

6. The drive system for the electric assist bicycle according to claim 1, wherein
   the controller is configured or programmed to use a first map in the first mode that defines a relationship between an assist ratio and the pedaling force applied to the pedal; and
   the controller is configured or programmed to use a second map in the second mode that defines a relationship between an assist ratio and the pedaling force applied to the pedal.

7. The drive system for the electric assist bicycle according to claim 1, wherein
   the controller further includes a third mode having a different assist ratio from the first mode and the second mode; and
   the controller is configured or programmed to include a predetermined mode change disapproval time period to prevent a mode change between two consecutive mode changes.

8. The drive system for the electric assist bicycle according to claim 7, wherein
   when one pedaling motion is defined as a rotation from an uppermost position to the lowermost position of the locus of the pedal, the predetermined mode change disapproval period is shorter than a time necessary to perform the one pedaling motion.

9. The drive system for the electric assist bicycle according to claim 7, wherein
   when one pedaling motion is defined as a rotation from an uppermost position to the lowermost position of the locus of the pedal, the predetermined mode change disapproval period is equal to or longer than a time necessary to perform the one pedaling motion.

10. The drive system for the electric assist bicycle according to claim 7, wherein
    when one pedaling motion is defined as a rotation from an uppermost position to the lowermost position of the locus of the pedal, a first disapproval period and a second disapproval period longer than the first disapproval period are included in the predetermined mode change disapproval period; and
    one of the first disapproval period and the second disapproval period determined on a basis of a riding situation of the bicycle is performed between two consecutive mode changes.

11. The drive system for the electric assist bicycle according to claim 7, wherein
    when one pedaling motion is defined as a rotation from an uppermost position to the lowermost position of the locus of the pedal, the predetermined mode change disapproval period is defined by either a number of the pedaling motions or a rotation amount of the crank shaft; and
    the controller is configured or programmed to count the number of the pedaling motions and the rotation amount of the crank shaft, and to determine whether or not the predetermined mode change disapproval period has elapsed based on either the counted number of pedaling motions or the rotation amount of the crank shaft.

12. The drive system for the electric assist bicycle according to claim 1, wherein
    the controller is configured or programmed to determine whether or not the mode change condition is fulfilled based on the pedaling force detected by the sensor.

13. The drive system for the electric assist bicycle according to claim 1, wherein
    the controller includes at least three modes including the first mode, the second mode, and a third mode;
    the second mode has a higher assist ratio than the first mode;
    the third mode has a higher assist ratio than the second mode;
    the mode change condition from the first mode to the second mode includes a condition that the pedaling force detected by the sensor is higher than a first threshold value;
    a mode change condition from the second mode to the third mode includes a condition that the pedaling force detected by the sensor is higher than a second threshold value; and
    the second threshold value is higher than the first threshold value.

14. The drive system for the electric assist bicycle according to claim 1, wherein
    the controller includes at least three modes including the first mode, the second mode, and a third mode; and
    at least one of the mode change condition from the first mode to the second mode and a mode change condition from the second mode to the third mode is able to be adjusted through an input operable by an operator.

15. The drive system for the electric assist bicycle according to claim 1, wherein
the controller includes at least three control modes including the first mode, the second mode, and a third mode; and
the controller is configured or programmed to receive an instruction from an input operable by an operator in which the instruction limits a control mode to be used by the controller to one or more of the at least three control modes.

16. The drive system for the electric assist bicycle according to claim 1, wherein
a first mode change condition and a second mode change condition are included in the mode change condition from the first mode to the second mode;
the controller is configured or programmed to calculate a first value and a second value different in type different from the first value based on an output of the sensor;
the first mode change condition is defined as the first value; and
the second mode change condition is defined as the second value.

17. The drive system for the electric assist bicycle according to claim 1, wherein
a first mode change condition and a second mode change condition are included in the mode change condition from the first mode to the second mode;
when one pedaling motion is defined as a rotation from an uppermost position to the lowermost position of the locus of the pedal, the first mode change condition is based on the pedaling force of the one pedaling motion; and
the second mode change condition is defined as the pedaling force of a plurality of pedaling motions.

18. An electric assist bicycle comprising:
the drive system according to claim 1; and
the pedal.

* * * * *